United States Patent
Adachi

(10) Patent No.: US 10,254,427 B2
(45) Date of Patent: Apr. 9, 2019

(54) FOREIGN OBJECT DETECTION DEVICE

(71) Applicant: Panasonic Intellectual Property Management Co., Ltd., Osaka (JP)

(72) Inventor: Kazuhiro Adachi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 12 days.

(21) Appl. No.: 15/507,098

(22) PCT Filed: Aug. 21, 2015

(86) PCT No.: PCT/JP2015/004196
§ 371 (c)(1),
(2) Date: Feb. 27, 2017

(87) PCT Pub. No.: WO2016/031209
PCT Pub. Date: Mar. 3, 2016

(65) Prior Publication Data
US 2017/0248726 A1    Aug. 31, 2017

(30) Foreign Application Priority Data

Aug. 28, 2014 (JP) .................................. 2014-173667

(51) Int. Cl.
*G01V 3/10* (2006.01)
*H01F 27/28* (2006.01)
(Continued)

(52) U.S. Cl.
CPC .............. *G01V 3/108* (2013.01); *H01F 5/00* (2013.01); *H01F 27/28* (2013.01); *H01F 38/14* (2013.01); *H02J 50/60* (2016.02)

(58) Field of Classification Search
CPC ...... G01V 3/108; H01F 27/28; G01D 5/2013; G01D 5/202; G01D 5/2006; G01B 7/14; G01B 7/003
See application file for complete search history.

(56) References Cited

U.S. PATENT DOCUMENTS

2012/0091989 A1\* 4/2012 Uramoto ................. H02J 5/005
324/76.11
2013/0169062 A1 7/2013 Maikawa et al.
(Continued)

FOREIGN PATENT DOCUMENTS

DE    10-2012-108671 A1    5/2014
DE    10-2013-010695 A1    8/2014
(Continued)

OTHER PUBLICATIONS

Extended European Search Report issued in European Patent Application No. 15836895.1, dated Aug. 21, 2017.
(Continued)

*Primary Examiner* — Jermele M Hollington
*Assistant Examiner* — Suresh K Rajaputra
(74) *Attorney, Agent, or Firm* — McDermott Will & Emery LLP

(57) ABSTRACT

A foreign object detection device in the present disclosure includes: a set sensor coil; and a determination device that detects a foreign object, based on voltage of the set sensor coil. A first sensor coil group in the set sensor coil includes unit sensor coils wound in a first winding direction and unit sensor coils wound in a second winding direction opposite to the first winding direction, these coils wound in the respective directions being electrically connected in series. Each unit sensor coil includes a coil conductor prescribing its external shape. Coil conductors are continuously and electrically connected in series. A part or the whole of the coil conductor forming the unit sensor coil in the first winding direction is a part or the whole of the coil conductor forming the unit sensor coil in the second winding direction.

14 Claims, 19 Drawing Sheets

(51) Int. Cl.
*H01F 5/00* (2006.01)
*H01F 38/14* (2006.01)
*H02J 50/60* (2016.01)

(56) References Cited

U.S. PATENT DOCUMENTS

| | | | |
|---|---|---|---|
| 2013/0241300 A1* | 9/2013 | Miyamoto | H01F 5/003 307/104 |
| 2013/0241302 A1* | 9/2013 | Miyamoto | H02J 50/12 307/104 |
| 2015/0276965 A1 | 10/2015 | Turki | |
| 2015/0362614 A1 | 12/2015 | Obayashi et al. | |
| 2015/0367739 A1 | 12/2015 | Boser et al. | |

FOREIGN PATENT DOCUMENTS

| | | |
|---|---|---|
| JP | H03-161998 A | 7/1991 |
| JP | 2012-249401 A | 12/2012 |
| JP | 2013-192391 A | 9/2013 |
| JP | 2014-126512 A | 7/2014 |

OTHER PUBLICATIONS

International Search Report issued in Application No. PCT/JP2015/004196 dated Nov. 10, 2015, with English translation.

\* cited by examiner

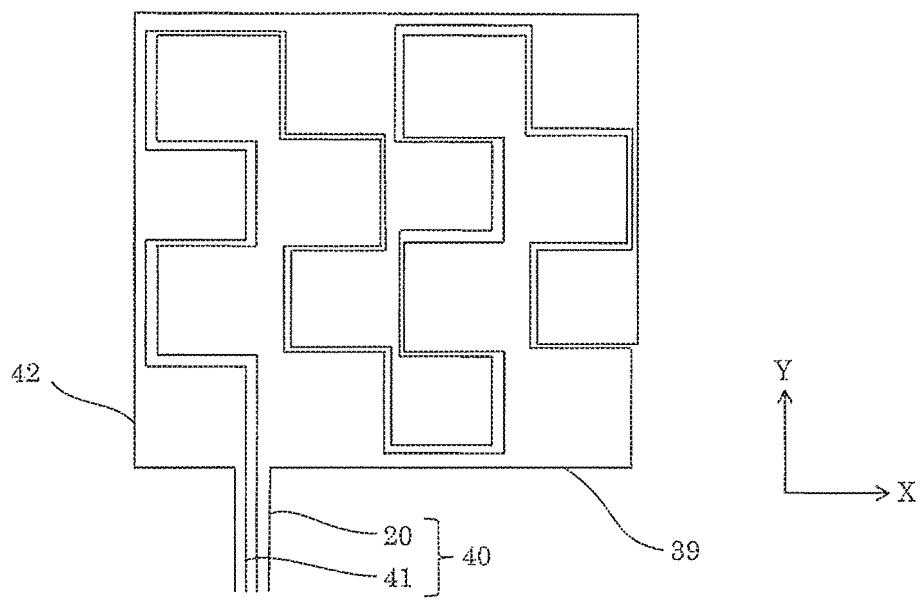

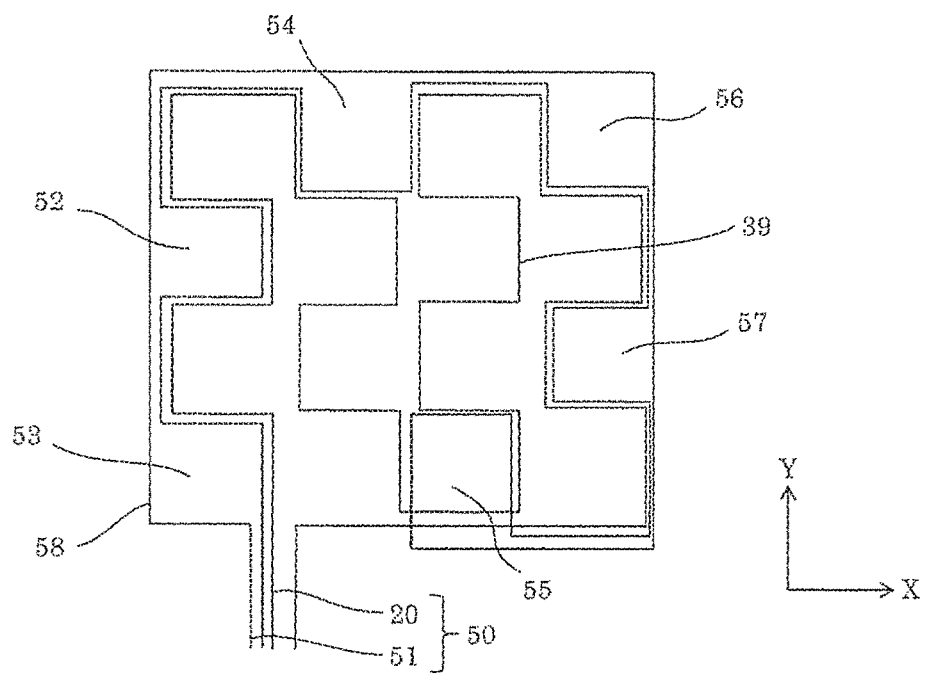

| 61a+ |      | 62c+ |      | 63e+ |      | 64g+ |      | 65h+ |
|------|------|------|------|------|------|------|------|------|
|      | 62b+ | 71b− | 63d+ | 72d− | 64f+ | 73f− | 65g+ |      |
| 62a+ | 71a− | 63c+ | 72c− | 64e+ | 73e− | 65f+ | 74e− | 66f+ |
|      | 63b+ | 72b− | 64d+ | 73d− | 65e+ | 74d− | 66e+ |      |
| 63a+ | 72a− | 64c+ | 73c− | 65d+ | 74c− | 66d+ | 75c− | 67d+ |
|      | 64b+ | 73b− | 65c+ | 74b− | 66c+ | 75b− | 67c+ |      |
| 64a+ | 73a− | 65b+ | 74a− | 66b+ | 75a− | 67b+ | 76a− | 68b+ |
|      | 65a+ |      | 66a+ |      | 67a+ |      | 68a+ |      |

FIG. 14

| PATTERN | FIRST ARRANGEMENT | SECOND ARRANGEMENT | THIRD ARRANGEMENT | FOURTH ARRANGEMENT | OVERALL DETERMINATION |
|---|---|---|---|---|---|
| FIRST PATTERN | × | × | × | × | × |
| SECOND PATTERN | × | ○ | ○ | ○ | ○ |
| THIRD PATTERN | × | ○ | × | ○ | △ | ns
FOREIGN OBJECT DETECTION DEVICE

RELATED APPLICATIONS

This application is the U.S. National Phase under 35 U.S.C. § 371 of International Application No. PCT/JP2015/004196, filed on Aug. 21, 2015, which in turn claims the benefit of Japanese Application No. 2014-173667, filed on Aug. 28, 2014, the disclosures of which are incorporated by reference herein.

TECHNICAL FIELD

The present disclosure relates to wireless charging, with which electric power is transmitted in a non-contact manner, and to a foreign object detection device which detects a foreign object that influences the power transmission.

BACKGROUND ART

The technique of supplying power in a non-contact manner is called wireless charging. An example of a wireless charging system includes a power supply device on the power supply side and a power receiving device on the power receiving side, and transmits power through electromagnetic induction or magnetic resonance. Such a wireless charging system has been studied for its application to the transmission of high power used for, for example, charging of an electric vehicle, in addition to the transmission of low power used by, for example, a cellular phone or an electric toothbrush.

The presence of a foreign object which is a conductive material, such as metal, between the power supply device and the power receiving device may cause an eddy current to the foreign object which then may possibly generate heat. When the foreign object is a ferromagnet, such as iron, heat generation may be caused by hysteresis loss. In particular, when the wireless charging system transmits high power, a large amount of heat may be generated by the foreign object.

In view of this, a foreign object detection device has been proposed for the wireless charging system. A known example of the foreign object detection device is a method achieved using a coil. With this method, an electromotive force caused by electromagnetic induction due to a coil placed in a time-varying magnetic field is used. Assume that a foreign object is present and an eddy current passes through this foreign object. In this case, since a part of magnetic flux avoids the foreign object, the magnetic flux density distribution is different from when no foreign object is present. When the foreign object is a ferromagnet, this means that the density of magnetic flux that passes through the foreign object increases. Thus, also in this case, the magnetic flux density distribution is different from when no foreign object is present. In this way, the magnetic field passing through the coil varies depending on the presence or absence of a foreign object. On this account, the electromotive force caused by the electromagnetic induction of the coil also varies depending on the presence or absence of a foreign object. The foreign object detection device detects a foreign object, based on this electromotive force.

A foreign object detection device is known which includes a plurality of coils and in which inductive currents passing through two adjacent coils flow in the mutually opposite directions when no foreign object is present. Moreover, another foreign object detection device is known which detects a foreign object using a magnetic field that is used for power transmission of a wireless charging system (see Patent Literature [PTL] 1)

CITATION LIST

Patent Literature

PTL 1: Japanese Unexamined Patent Application Publication No. 2012-249401

SUMMARY OF THE INVENTION

Problem that Invention is to Solve

However, the coils included in the foreign object detection device disclosed in PTL 1 have many overlaps of conductors that form the coils. Thus, the total length of the conductors forming the coils is long. The long total length of the conductors increases a voltage drop of the coils. Thus, the sensitivity of foreign object detection performed by the wireless charging system is reduced.

The present invention is conceived to solve the stated problem of the conventional technique, and provides a foreign object detection device that has a high detection sensitivity.

Means to Solve Problem

A foreign object detection device according to the present disclosure is a foreign object detection device which includes: a set sensor coil; and a determination device that detects a foreign object, based on a voltage of the set sensor coil, wherein the set sensor coil includes at least one sensor coil group, the at least one sensor coil group includes, electrically connected in series: a plurality of unit sensor coils that are wound in a first winding direction; and a plurality of unit sensor coils that are wound in a second winding direction, the plurality of unit sensor coils that are wound in the first winding direction generate a first-sign electromotive force that causes a current to flow in a first direction in response to a change in an external magnetic field in which magnetic field distribution is uniform, the plurality of unit sensor coils that are wound in the second winding direction generate a second-sign electromotive force that causes a current to flow in a second direction opposite to the first direction in response to the change in the external magnetic field, each of the plurality of unit sensor coils has a coil conductor that prescribes an external shape of the unit sensor coil, and a plurality of the coil conductors included in the at least one sensor coil group are continuously and electrically connected in series, and a part or a whole of the coil conductor forming the unit sensor coil wound in the first winding direction is a part or a whole of the coil conductor forming the unit sensor coil wound in the second winding direction.

Advantageous Effects of Invention

With the present invention, a foreign object detection device that has a high sensitivity of foreign object detection can be provided.

BRIEF DESCRIPTION OF DRAWINGS

FIG. 3A is a diagram showing an arrangement of unit sensor coils included in a foreign object detection device according to Embodiment 1.

FIG. 3B is a diagram of mapping of unit sensor coils shown in FIG. 3A.

FIG. 4A is a diagram showing a first variation of arrangement of unit sensor coils included in a foreign object detection device according to Embodiment 1.

FIG. 4B is a diagram of mapping of unit sensor coils shown in FIG. 4A.

FIG. 14 is a diagram showing sensitivity evaluation according to Reference Example 1.

DESCRIPTION OF EXEMPLARY EMBODIMENTS

Hereinafter, embodiments according to the present disclosure are described with reference to the drawings. It should be noted that the present invention is not limited to the embodiments described below.

Embodiment 1

A foreign object detection device according to Embodiment 1 is described with reference to the drawings.

Figure 1:
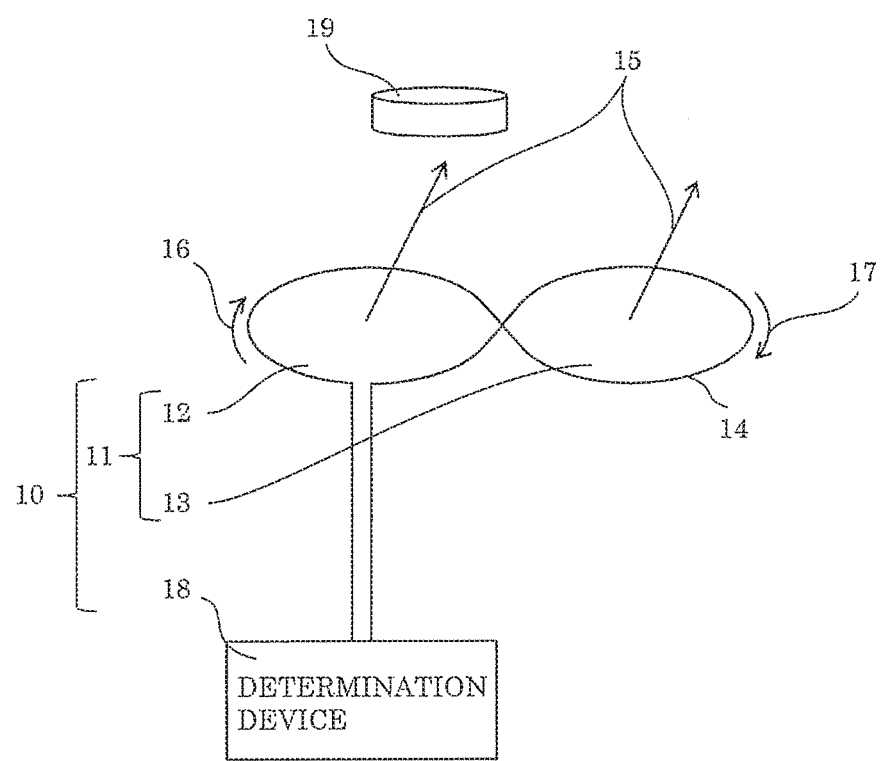
FIG. 1 is a diagram showing an operating principle of a foreign object detection device according to Embodiment 1.

FIG. 1 is a diagram showing an operating principle of the foreign object detection device according to Embodiment 1. Foreign object detection device 10 includes set sensor coil 11 and determination device 18. Set sensor coil 11 includes a plurality of unit set sensor coils including unit set sensor coil 12 and unit sensor coil 13. Each external shape of unit sensor coil 12 and unit sensor coil 13 is prescribed by coil conductor 14. Coil conductors 14 are continuously connected and electrically connected in series. A set of unit sensor coils having the external shapes prescribed by coil conductors 14 that are continuously connected and electrically connected in series is defined as a sensor coil group. FIG. 1 shows only one sensor coil group, which is thus set sensor coil 11. Each of unit sensor coil 12 and unit sensor coil 13 generates an electromotive force by a change in the external magnetic field. Here, determination device 18 determines the presence or absence of a foreign object, based on an electromotive force of set sensor coil 11.

The following describes the operating principle of foreign object detection device 10 shown in FIG. 1. First, a case where foreign object 19 is absent is described.

Assume that external magnetic field 15 passes through unit sensor coil 12 and unit sensor coil 13 and is constant in magnitude and direction. Assume also that external magnetic field 15 increases in the directions indicated by the arrows shown in FIG. 1. Moreover, assume that unit sensor coil 12 and unit sensor coil 13 are the same in shape and size.

In this case, an electromotive force that passes first-direction current 16 is induced in unit sensor coil 12 through electromagnetic induction. This electromotive force induced in unit sensor coil 12 is referred to as a first-sign electromotive force. Moreover, a direction in which the unit sensor coil inducing the first-sign electromotive force is wound is referred to as a first winding direction. Similarly, an electromotive force that passes second-direction current 17 opposite to first-direction current 16 is induced in unit sensor coil 13 through electromagnetic induction. This electromotive force induced in unit sensor coil 13 is a second-sign electromotive force that is opposite in sign to the first-sign electromotive force. Moreover, a direction in which the unit sensor coil inducing the second-sign electromotive force is wound is referred to as a second winding direction. Since unit sensor coil 12 and unit sensor coil 13 are the same in shape and size, the first-sign electromotive force and the second-sign electromotive force have the same absolute value. The electromotive forces induced in unit sensor coil 12 and unit sensor coil 13 cancel each other out. Thus, the electromotive force of set sensor coil 11 is 0 V.

Next, a case where foreign object 19 is present is described. Assume that foreign object 19 is present on magnetic flux passing through unit sensor coil 12. Here, when foreign object 19 is a ferromagnet, such as iron, and hysteresis loss is thus caused, the influence results in that the magnetic flux passing through unit sensor coil 12 becomes larger than the magnetic flux passing through unit sensor coil 13. When foreign object 19 is a conductive material, an eddy current is caused inside foreign object 19. With the influence of the magnetic field due to this eddy current, the external magnetic flux passing through unit sensor coil 12 becomes smaller than the external magnetic flux passing through unit sensor coil 13. In this way, the presence of foreign object 19 causes a biased distribution of the magnetic field, which results in a difference between the absolute values of the electromotive forces induced in unit sensor coil 12 and unit sensor coil 13. With this, the electromotive force of set sensor coil 11 is no longer 0. When the electromotive force of set sensor coil 11 is not 0, determination device 18 determines that foreign object 19 is present.

As compared with the magnetic field generated by the charging system, the magnetic field change caused by the presence of foreign object 19 is extremely small. In particular, in the case of high-power transmission for, for example, an electric vehicle, such a difference is remarkable. Thus, it may be difficult to distinguish between electromotive force change due to the presence of foreign object and electromotive force change due to noise. However, as long as the electromotive force is 0 V when foreign object 19 is absent, it is easy to detect the electromotive force change caused by the presence of foreign object 19. For the reason described above, foreign object detection device 10 shown in FIG. 1 is designed so that the electromotive force of unit sensor coil 12 and the electromotive force of unit sensor coil 13 cancel each other out when foreign object 19 is absent.

The operating principle of foreign object detection device 10 has been thus described. Note that it is difficult to make the electromotive force of set sensor coil 11 completely 0 V when foreign object 19 is absent. Thus, in reality, a threshold value having a tolerance to some extent with respect to 0 V is set, and the presence or absence of a foreign object is determined with reference to this threshold value.

It should be noted that the term "sign" included in the first-sign electromotive force and the second-sign electromotive force specifically refers to a sign of voltage generated by electromagnetic induction. Here, assume that one unit sensor coil is inducing the first-sign electromotive force at a certain moment. In this example, when the positive or negative sign of the electromotive force of the other unit sensor coil is the same as the sign of the first-sign electromotive force induced by the one unit sensor coil, the sign of the electromotive force of the other unit sensor coil is the first sign. When the sign of the electromotive force of the other unit sensor coil is different from the sign of the first-sign electromotive force induced by the one unit sensor coil, the sign of the electromotive force of the other unit sensor coil is the second sign. Generally speaking, although a unit sensor coil induces a positive electromotive force at a certain moment, this unit sensor coil subsequently induces a negative electromotive force and then a positive electromotive force again. In other words, the sign of the electromotive force is not fixed to positive or negative originally. Moreover, the "first sign" is not fixed to "positive" nor "negative." Similarly, the arrow directions of first-direction current 16 and second-direction current 17 in FIG. 1 vary with time and thus are not fixed.

Figure 2A:
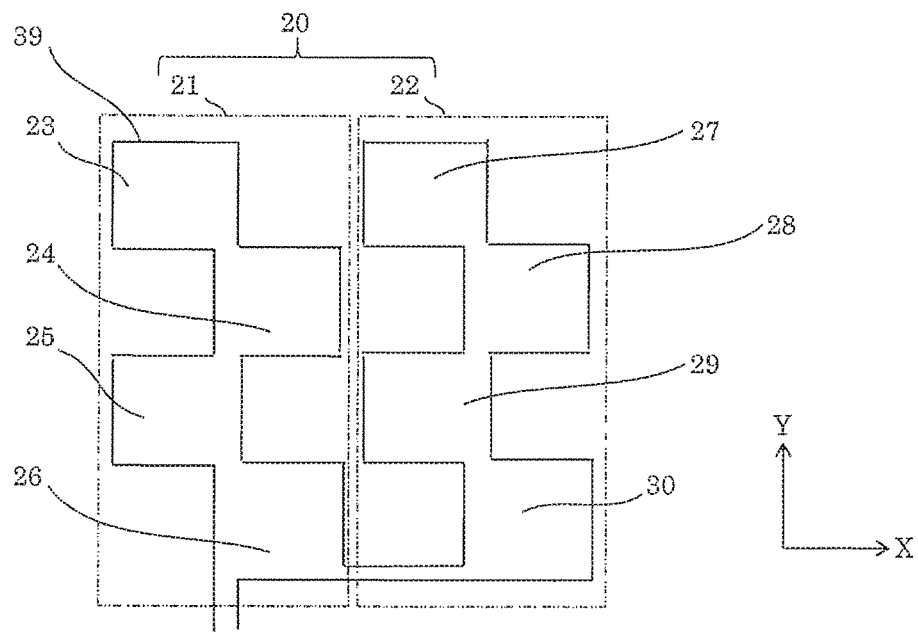
FIG. 2A is a diagram showing a basic configuration of main components of a foreign object detection device according to Embodiment 1.
Figure 2B:
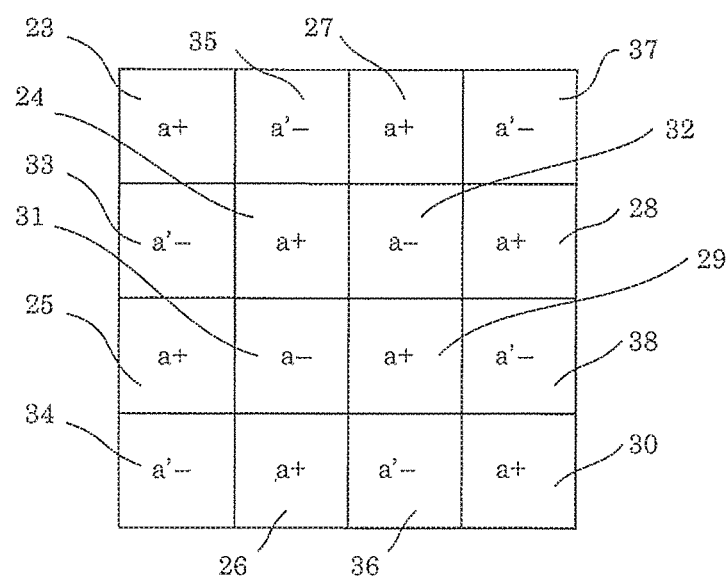
FIG. 2B is a diagram of mapping of unit sensor coils shown in FIG. 2A.

FIG. 2A is a diagram showing a basic configuration of main components of the foreign object detection device according to Embodiment 1. FIG. 2B is a diagram of mapping of unit sensor coils shown in FIG. 2A. It should be noted that "a" shown in FIG. 2B indicates the unit sensor coil that belongs to first sensor coil group 20 and that "+" indicates the unit sensor coil that is wound in the first winding direction. Note also that "−" indicates the unit sensor coil that is wound in the second winding direction. Thus, "a+" indicates the unit sensor coil that belongs to the first sensor coil group 20 and that is wound in the first winding direction. Moreover, "a−" indicates the unit sensor coil that belongs to the first sensor coil group 20 and that is wound in the second winding direction. Here, "a'−" is described later.

In FIG. 2, only one sensor coil group is shown, that is, first sensor coil group 20. When the number of sensor coil groups is only one, this sensor coil group also functions as a set sensor coil.

First sensor coil group 20 includes a plurality of Y-axis-direction sensor coil groups including first Y-axis-direction sensor coil group 21 and second Y-axis-direction sensor coil group 22. First Y-axis-direction sensor coil group 21 and second Y-axis-direction sensor coil group 22 are arranged side by side in the X axis direction. First Y-axis-direction sensor coil group 21 includes unit sensor coils 23 to 26 that are wound in the first winding direction. Unit sensor coils 23 to 26 are placed along the Y axis direction when viewed as a whole, and also arranged in a staggered manner in the X axis direction.

Second Y-axis-direction sensor coil group 22 includes unit sensor coils 27 to 30. Unit sensor coils 27 to 30 are placed along the Y axis direction when viewed as a whole, and also arranged in a staggered manner in the X axis direction.

Between first Y-axis-direction sensor coil group 21 and second Y-axis-direction sensor coil group 22 that are adjacent to each other, unit sensor coil 31 and unit sensor coil 32 that are wound in the second winding direction are disposed. First sensor coil group 20 further includes unit sensor coil 31 and unit sensor coil 32 in addition to first Y-axis-direction sensor coil group 21 and second Y-axis-direction sensor coil group 22.

Coil conductors 39 are connected so that peripheries of these Y-axis-direction sensor coil groups are continuous. Coil conductors 39 prescribe the external shapes of the unit sensor coils. Coil conductors 39 are continuously and electrically connected in series. Except for the outermost peripheries, the unit sensor coil wound in the first winding direction and the unit sensor coil wound in the second winding direction are adjacent to each other. Among two adjacent unit sensor coils, one of the unit sensor coils is wound in the first winding direction and the other of the unit sensor coils is wound in the second winding direction. Moreover, when two unit sensor coils are adjacent to each other, the whole or a part of coil conductor 39 forming one of the unit sensor coils is the whole or a part of coil conductor 39 forming the other of the unit sensor coils. In other words, a part or the whole of coil conductors 39 forming the adjacent unit sensor coils is shared by these unit sensor coils. Thus, overlapping regions of the coil conductors 39 are reduced, resulting in a decrease in the total length of coil conductors 39.

A region between unit sensor coil 23 and unit sensor coil 25 does not form a closed loop and thus cannot form a unit sensor coil. This region is referred to as absence portion 33, in which a unit sensor coil is absent. Similarly, a region located below unit sensor coil 25 and on the left side of unit sensor coil 26 is absence portion 34. Moreover, a region between unit sensor coil 23 and unit sensor coil 27 is absence portion 35. Furthermore, a region located on the right side of unit sensor coil 27 and above unit sensor coil 28 is absence portion 37. Moreover, a region between unit sensor coil 28 and unit sensor coil 30 is absence portion 38. Furthermore, a region between unit sensor coil 26 and unit sensor coil 30 is absence portion 36. Absence portion 36 cannot form a unit sensor coil because electromotive forces of two conducting wires present below absence portion 36 flow in the opposite directions. It should be obvious that although the unit sensor coils shown in FIG. 2A are not completely closed circuits, electromotive force equivalent to that of a closed circuit can be obtained by reducing spaces.

Absence portions 33 to 38 are not necessarily without electromotive forces. Although absolute values of the electromotive forces induced by these absence portions are small as compared with those of the unit sensor coils, each of absence portions 33 to 38 induces the second-sign electromotive force. On this account, these absence portions are considered as incomplete coils that are wound in the second winding direction. In FIG. 2B, "a'−" indicates the incomplete coil that is wound in the second winding direction.

It should be noted that the number of unit sensor coils is not limited to the number of unit sensor coils shown in FIG. 2A. The sizes of the unit sensor coils may not be the same. The external shape of the unit sensor coil is not limited to a square. In FIG. 2A, although the X and Y axes are orthogonal coordinate axes, the X and Y axes may not be orthogonal to each other unless the axes are parallel coordinate axes. Thus, any coordinate system in which axes cross each other can be used.

As shown in FIG. 2B, the number of unit sensor coils wound in the first winding direction is larger than the number of unit sensor coils wound in the second winding direction. For this reason, the first-sign electromotive force and the second-sign electromotive force of first sensor coil group 20 can cancel each other out partially, instead of completely. Thus, when no foreign object is present, the electromotive force of first sensor coil group 20 cannot be 0.

FIG. 3A is a diagram showing the arrangement of the unit sensor coils included in the foreign object detection device according to Embodiment 1. FIG. 3B is a diagram of mapping of the unit sensor coils shown in FIG. 3A.

Set sensor coil 40 includes first sensor coil group 20 and second sensor coil group 41. First sensor coil group 20 shown in FIG. 3A has the same configuration as first sensor coil group 20 shown in FIG. 2A.

In FIG. 3A and FIG. 3B, "a" indicates the unit sensor coil that belongs to first sensor coil group 20 and "b" indicates the unit sensor coil that belongs to second sensor coil group 41. In these diagrams, the respective indications of "+", "−", and "" are the same as those in FIG. 2. Moreover, the usage of "a+", "a−", "a'−", "b+", "b−", "b'+" is also the same as in FIG. 2.

Second sensor coil group 41 includes a plurality of unit sensor coils. Coil conductor 42 has the following characteristics as with coil conductor 39. Coil conductors 42 prescribe the external shapes of the unit sensor coils. Coil conductor 42 prescribes the external shape of the corresponding unit sensor coil. Coil conductors 42 are continuously and electrically connected in series. Except for the outermost peripheries, the unit sensor coil wound in the first winding direction and the unit sensor coil wound in the second winding direction are adjacent to each other. Among two adjacent unit sensor coils, one of the unit sensor coils is wound in the first winding direction and the other of the unit sensor coils is wound in the second winding direction. Moreover, when two unit sensor coils are adjacent to each other, the whole or a part of coil conductor 42 forming one of the unit sensor coils is the whole or a part of coil conductor 42 forming the other of the unit sensor coils. In other words, a part or the whole of coil conductors 42 forming the adjacent unit sensor coils is shared by these unit sensor coils. Thus, overlapping regions of the coil conductors 42 are reduced, resulting in a decrease in the total length of coil conductors 42.

Here, four unit sensor coils located in the central portion other than the unit sensor coils located on the outermost periphery of set sensor coil 40 are disposed in a region where the unit sensor coils of both first sensor coil group 20 and second sensor coil group 41 are located. Thus, indications of these four unit sensor coils include both "a+" and "b+" or both "a−" and "b−".

In FIG. 3A, when the number of unit sensor coils wound in the first winding direction is equal to the number of unit sensor coils wound in the second winding direction and the magnetic field distribution is uniform with no presence of a foreign object, the electromotive force of set sensor coil 40 is 0. To make a close study, the number of incomplete coils in the absence portions need to be counted. As shown in FIG. 3B, the number of "a'−" is equal to the number of "b'+". Thus, even with consideration given to the influence of the absence portions, the electromotive force of set sensor coil 40 shown in FIG. 3A is 0 when the magnetic field distribution is uniform with no presence of a foreign object.

It should be noted that the electromotive force of set sensor coil 40 may be measured when coil conductor 39 forming first sensor coil group 20 is electrically connected in series with coil conductor 42 forming second sensor coil group 41. Alternatively, the electromotive force of coil conductor 39 and the electromotive force of coil conductor 42 may be separately obtained and then the voltages of these coil conductors may be added. Coil conductor 39 and coil conductor 42 may be electrically connected in parallel. In FIG. 3A, although the X and Y axes are orthogonal coordinate axes, the X and Y axes may not be orthogonal to each other unless the axes are parallel coordinate axes. Thus, any coordinate system in which axes cross each other can be used.

FIG. 4A is a diagram showing a first variation of arrangement of the unit sensor coils included in the foreign object detection device according to Embodiment 1. FIG. 4B is a diagram of mapping of the unit sensor coils shown in FIG. 4A.

Set sensor coil 50 includes first sensor coil group 20 and peripheral sensor coil group 51. First sensor coil group 20 has the same configuration as first sensor coil group 20 shown in FIG. 2A and FIG. 3A. Peripheral sensor coil group 51 includes peripheral unit sensor coils 52, 53, 54, 55, 56, and 57 that are disposed respectively in absence portions 33, 34, 35, 36, 37, and 38 shown in FIG. 2B. Peripheral sensor coil group 51 includes the peripheral unit sensor coils disposed only in the absence portions of first sensor coil group 20. In this regard, peripheral sensor coil group 51 is different from second sensor coil group 41 that has the unit sensor coils disposed in portions other than the absence portions as shown in FIG. 3A.

Coil conductors 58 prescribe the external shapes of the peripheral unit sensor coils.

It should be noted that peripheral sensor coil group 51 is a type of sensor coil group. Note also that each of the peripheral unit sensor coils is a type of unit sensor coil.

In FIG. 4B, "p" indicates a region of the peripheral unit sensor coil that belongs to peripheral sensor coil group 51. The other reference marks are the same as those shown in FIG. 3B. The peripheral unit sensor coils are wound only in the second winding direction. As shown in FIG. 4B, the number of unit sensor coils wound in the first winding direction is equal to the sum of the number of unit sensor coils and the number of peripheral unit sensor coils that are wound in the second winding direction. On this account, when no foreign object is present and the magnetic field distribution is uniform, the electromotive force of set sensor coil 50 is 0 V. The incomplete coils in the absence portions of first sensor coil group 20 and the incomplete coils in the absence portions of peripheral sensor coil group 50 are the same in number and different in sign. For this reason, even with consideration given to the influence of the absence portions, the electromotive force of set sensor coil 50 shown in FIG. 4A is 0 when the magnetic field distribution is uniform with no presence of a foreign object.

It should be noted that although the X and Y axes in FIG. 4A are orthogonal coordinate axes, the X and Y axes may not be orthogonal to each other unless the axes are parallel coordinate axes. Thus, any coordinate system in which axes cross each other can be used.

Figures 5A, 5B:
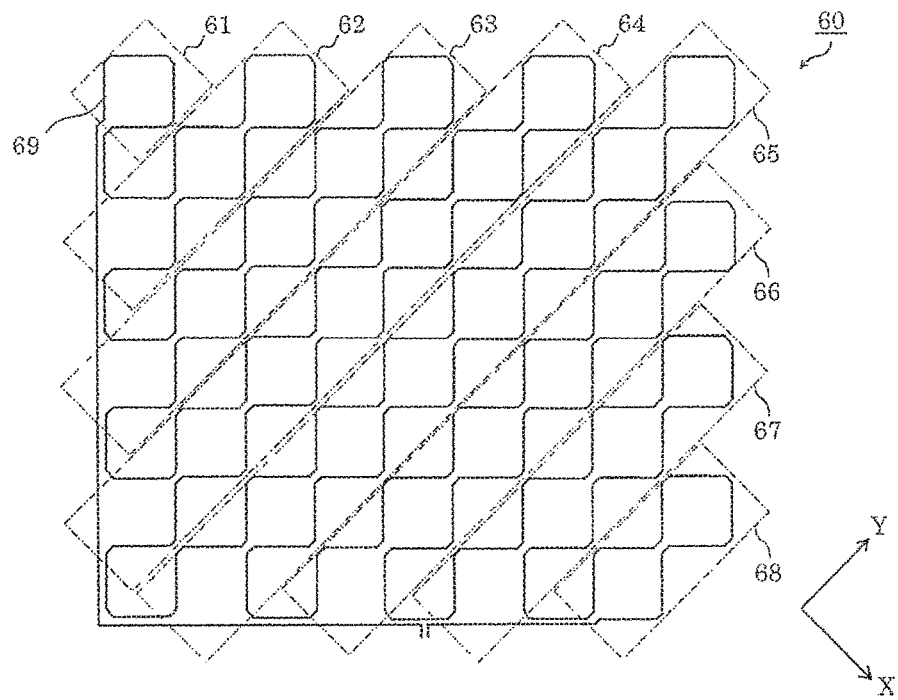
FIG. 5A is a diagram showing a second variation of arrangement of unit sensor coils included in a foreign object detection device according to Embodiment 1.
FIG. 5B is a diagram of mapping of the unit sensor coils shown in FIG. 5A.

FIG. 5A is a diagram showing a second variation of arrangement of the unit sensor coils included in the foreign object detection device according to Embodiment 1. FIG. 5B is a diagram of mapping of the unit sensor coils shown in FIG. 5A. Reference marks of the unit sensor coils are shown in FIG. 5B. In FIG. 5B, each of the reference marks indicates the sign and winding direction of the corresponding unit sensor coil. For example, "61*a*+" indicates unit sensor coil 61*a* wound in the first winding direction.

In FIG. 5A, the number of sensor coil groups is only one, that is, sensor coil group 60. Thus, sensor coil group 60 also functions as a set sensor coil.

Sensor coil group 60 includes Y-axis-direction sensor coil groups 61, 62, 63, 64, 65, 66, 67, and 68.

Y-axis-direction sensor coil group 61 includes unit sensor coil 61*a*. Y-axis-direction sensor coil group 62 includes unit sensor coils 62*a*, 62*b*, and 62*c*. Y-axis-direction sensor coil group 63 includes unit sensor coils 63*a*, 63*b*, 62*c*, 63*d*, and 63*e*. Y-axis-direction sensor coil group 64 includes unit sensor coils 64*a*, 64*b*, 64*c*, 64*d*, 64*e*, 64*f*, and 64*g*. Y-axis-direction sensor coil group 65 includes unit sensor coils 65*a*, 65*b*, 65*c*, 65*d*, 65*e*, 65*f*, 65*g*, and 65*h*. Y-axis-direction sensor coil group 66 includes unit sensor coils 66*a*, 66*b*, 66*c*, 66*d*, 66*e*, and 66*f*. Y-axis-direction sensor coil group 67 includes unit sensor coils 67*a*, 67*b*, 67*c*, and 67*d*. Y-axis-direction sensor coil group 68 includes unit sensor coils 68*a* and 68*b*.

Each of the Y-axis-direction sensor coil groups includes one or more unit sensor coils arranged along the Y axis direction and wound in the first winding direction. These unit sensor coils wound in the first winding direction are continuously connected and electrically connected in series. The Y-axis-direction sensor coil groups are arranged side by side in the X axis direction. Among the Y-axis-direction sensor coil groups, adjacent Y-axis-direction sensor coil groups are continuously and electrically connected in series.

Coil conductors 69 prescribe the external shapes of these unit sensor coils wound in the first winding direction. Coil conductors 69 are connected so that peripheries of these Y-axis-direction sensor coil groups are continuous. Coil conductor 69 prescribes the external shape of the corresponding unit sensor coil. Coil conductors 69 are continuously and electrically connected in series.

Except for the outermost peripheral portion of sensor coil group 60 functioning as the set sensor coil, the unit sensor coil wound in the second winding direction is disposed between the adjacent Y-axis-direction sensor coil groups. To be more specific, unit sensor coils 71*a* and 71*b* wound in the second winding direction are disposed between Y-axis-direction sensor coil group 62 and Y-axis-direction sensor coil group 63. Unit sensor coils 72*a*, 72*b*, 72*c*, and 72*d* wound in the second winding direction are disposed between Y-axis-direction sensor coil group 63 and Y-axis-direction sensor coil group 64. Unit sensor coils 73*a*, 73*b*, 73*c*, 73*d*, 73*e*, and 73*f* wound in the second winding direction are disposed between Y-axis-direction sensor coil group 64 and Y-axis-direction sensor coil group 65. Unit sensor coils 74*a*, 74*b*, 74*c*, 74*d*, and 74*e* wound in the second winding direction are disposed between Y-axis-direction sensor coil group 65 and Y-axis-direction sensor coil group 66. Unit sensor coils 75*a*, 75*b*, and 75*c* wound in the second winding direction are disposed between Y-axis-direction sensor coil group 66 and Y-axis-direction sensor coil group 67. Unit sensor coil 76*a* wound in the second winding direction is disposed between Y-axis-direction sensor coil group 67 and Y-axis-direction sensor coil group 68.

Except for the outermost peripheries, the unit sensor coil wound in the first winding direction and the unit sensor coil wound in the second winding direction are adjacent to each other. Among two adjacent unit sensor coils, one of the unit sensor coils is wound in the first winding direction and the other of the unit sensor coils is wound in the second winding direction. Moreover, when two unit sensor coils are adjacent to each other, the whole or a part of coil conductor 69 forming one of the unit sensor coils is the whole or a part of coil conductor 69 forming the other of the unit sensor coils. In other words, a part or the whole of coil conductors 69 forming the adjacent unit sensor coils is shared by these unit sensor coils. Thus, overlapping regions of the coil conductors 69 are reduced, resulting in a decrease in the total length of coil conductors 69.

In the sensor coil group 60 in the present variation as shown in FIG. 5B, the number of unit sensor coils wound in the first winding direction is different from the number of unit sensor coils wound in the second winding direction. On this account, even when no foreign object is present and the magnetic field distribution is uniform, the electromotive force of sensor coil group 60 is not 0 V.

In order to make the electromotive force of the set sensor coil 0 V, another sensor coil group different from sensor coil group 60, such as second sensor coil group 41 shown in FIG. 3A, may be added. Alternatively, another sensor coil group, such as peripheral sensor coil group 51 shown in FIG. 4A, may be added.

It should be noted that although the X and Y axes in FIG. 5A are orthogonal coordinate axes, the X and Y axes may not be orthogonal to each other unless the axes are parallel coordinate axes. Thus, any coordinate system in which axes cross each other can be used.

Figure 6:
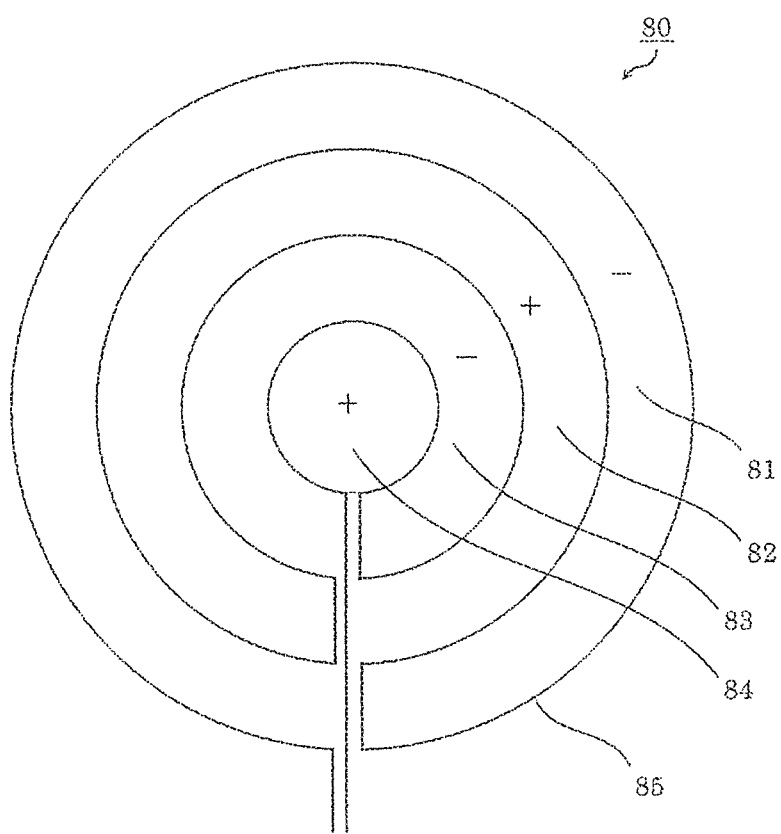
FIG. 6 is a diagram showing a third variation of arrangement of unit sensor coils included in a foreign object detection device according to Embodiment 1.

FIG. 6 is a diagram showing a third variation of arrangement of the unit sensor coils included in the foreign object detection device according to Embodiment 1.

Sensor coil group 80 also functions as a set sensor coil. Sensor coil group 80 includes unit sensor coils 81, 82, 83, and 84. Coil conductors 85 prescribe the peripheries of these unit sensor coils. Coil conductors 85 are continuously and electrically connected in series.

The unit sensor coil wound in the first winding direction and the unit sensor coil wound in the second winding direction are adjacent to each other. Among two adjacent unit sensor coils, one of the unit sensor coils is wound in the first winding direction and the other of the unit sensor coils is wound in the second winding direction. Moreover, when two unit sensor coils are adjacent to each other, the whole or a part of coil conductor 85 forming one of the unit sensor coils is the whole or a part of coil conductor 85 forming the other of the unit sensor coils. In other words, a part or the whole of coil conductors 85 forming the adjacent unit sensor coils is shared by these unit sensor coils. Thus, overlapping regions of the coil conductors 85 are reduced, resulting in a decrease in the total length of coil conductors 85.

Each of the unit sensor coils, except for unit sensor coil 84 disposed in the center, has a hollow circle shape, or a so-called doughnut shape. Unit sensor coil 84 disposed in the center has a circle shape. The unit sensor coils are continuously and electrically connected in series.

In FIG. 6, sensor coil group 80 has a spiral shape. However, the external shape of sensor coil group 80 may be a polygon, such as a square or a pentagon.

Figure 7:
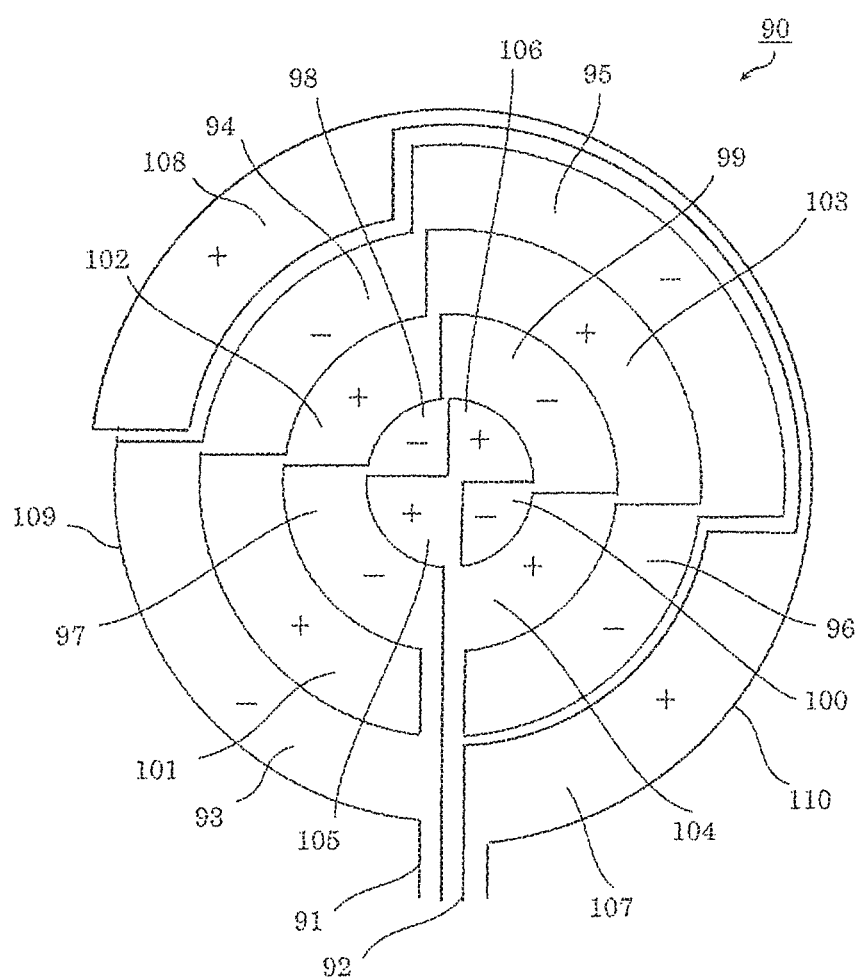
FIG. 7 is a diagram showing a fourth variation of arrangement of unit sensor coils included in a foreign object detection device according to Embodiment 1.

FIG. 7 is a diagram showing a fourth variation of arrangement of the unit sensor coils included in the foreign object detection device according to Embodiment 1.

Set sensor coil 90 includes first sensor coil group 91 and peripheral sensor coil group 92. First sensor coil group 91 includes unit sensor coils 93, 94, 95, 96, 97, 98, 99, and 100 that are wound in the second winding direction. First sensor coil group 91 further includes unit sensor coils 101, 102, 103, 104, 105, and 106 that are wound in the first winding direction. Peripheral sensor coil group 92 includes peripheral unit sensor coils 107 and 108. Peripheral unit sensor coils 107 and 108 are disposed in absence portions in the outermost peripheral portion of first sensor coil group 91.

Coil conductors 109 prescribe the external shapes of the unit sensor coils. Coil conductors 109 are continuously and electrically connected in series. Except for the outermost peripheries, the unit sensor coil wound in the first winding direction and the unit sensor coil wound in the second winding direction are adjacent to each other. Among two adjacent unit sensor coils, one of the unit sensor coils is wound in the first winding direction and the other of the unit sensor coils is wound in the second winding direction. Moreover, when two unit sensor coils are adjacent to each other, the whole or a part of coil conductor 109 forming one of the unit sensor coils is the whole or a part of coil conductor 109 forming the other of the unit sensor coils. In other words, a part or the whole of coil conductors 109 forming the adjacent unit sensor coils is shared by these unit sensor coils. Thus, overlapping regions of the coil conductors 109 are reduced, resulting in a decrease in the total length of coil conductors 109.

Coil conductors 110 prescribe the external shapes of the peripheral unit sensor coils.

In set sensor coil 90 shown in FIG. 7, the number of unit sensor coils wound in the first winding direction is equal to the number of unit sensor coils wound in the second winding direction. On this account, when no foreign object is present and the magnetic field distribution is uniform, the electromotive force is 0 V.

In FIG. 7, lengths of the unit sensor coils of set sensor coil 90 in a radial direction are equal. However, this example is not intended to be limiting. The unit sensor coil located closer to the peripheral region may have a shorter length in the radial direction so that the unit sensor coils are equal in area. The width of the unit sensor coil in the radial direction may be determined so that absolute values of the electromotive forces of the unit sensor coils are nearly equal when no foreign object is present. This also holds true for the third variation of the unit sensor coils included in the foreign object detection device shown in FIG. 6.

In the present variation, quartering in an angular direction is described. However, this example is not intended to be limiting.

In the foreign object detection device according to Embodiment 1, the electromotive force of the set sensor coil is 0 V when the magnetic field distribution is uniform and no foreign object is present. In reality, however, the magnetic field distribution may be different in size and direction, instead of being uniform. Moreover, it is possible that the direction of the magnetic field may be partially opposite in some cases. In such a case, the electromotive force of the set sensor coil may not be 0 V. However, the electromotive force of the unit sensor coil wound in the first winding direction and the electromotive force the unit sensor coil would in the second winding direction cancel each other out at least in part. This enhances the sensitivity of the foreign object detection device. In the vicinity of the boundary from which the magnetic field direction becomes opposite, one unit sensor coil and adjacent unit sensor coils thereof have currents flowing all in the first direction or all in the second direction in response to the actual change in the magnetic field. Such a phenomenon is caused in the vicinity of the boundary at which the magnetic field directions on both sides are opposite to each other. In the other regions, one of the currents generated at the adjacent unit sensor coils is in the first direction, and the other is in the second direction in response to the actual magnetic field. On this account, the electromotive forces cancel each other out at least in part on the whole, and thus the sensitivity of the foreign object detection device is enhanced.

When the magnetic field distribution is nonuniform, including the case where the magnetic field direction becomes opposite, the electromotive force of the set sensor coil can be adjusted by adjusting the areas and number of the unit sensor coils.

It should be noted that when the areas of the unit sensor coils are different, the electromotive force may not be 0 V even if the magnetic field distribution is uniform. Also in this case, the electromotive force of the unit sensor coil wound in the first winding direction and the electromotive force of the unit sensor coil wound in the second winding direction still cancel each other out at least in part. Thus, the sensitivity of the foreign object detection device can be enhanced.

In Embodiment 1, when the set sensor coil includes a plurality of sensor coil groups, the sensor coil groups may be electrically connected in series or electrically connected in parallel to obtain the electromotive force of the set sensor coil. Alternatively, the electromotive force may be obtained for each of the sensor coil groups, and then these obtained electromotive forces may be added to obtain the electromotive force of the set sensor coil.

The coil conductors of the foreign object detection device according to Embodiment 1 do not cross each other in a region where the external shapes of the unit sensor coils are prescribed.

Embodiment 2

Figure 8:
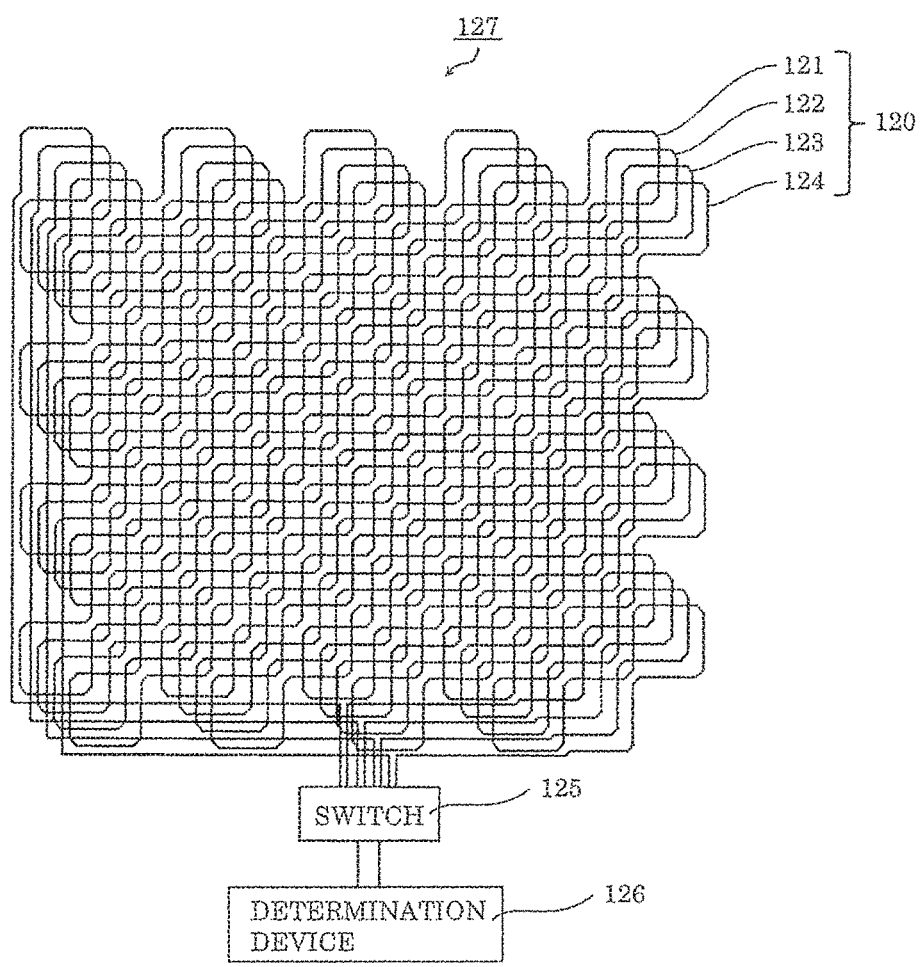
FIG. 8 is a diagram showing a basic configuration of main components of a foreign object detection device according to Embodiment 2.

FIG. 8 is a diagram showing a basic configuration of main components of a foreign object detection device according to Embodiment 2. Note that FIG. 8 is a perspective view.

Foreign object detection device 127 includes set sensor coil group 120, switch 125, and determination device 126. Set sensor coil group 120 includes first set sensor coil 121, second set sensor coil 122, third set sensor coil 123, and fourth set sensor coil 124.

Switch 125 selectively drives first set sensor coil 121, second set sensor coil 122, third set sensor coil 123, and fourth set sensor coil 124. Determination device 126 has the same function as determination device 18 according to Embodiment 1.

Each of first set sensor coil 121, second set sensor coil 122, third set sensor coil 123, and fourth set sensor coil 124 has the same configuration as sensor coil group 60 shown in FIG. 5A.

Second set sensor coil 122 is arranged to be offset with respect to first set sensor coil 121 in the vertical and horizontal directions in the plane of FIG. 8. Similarly, third set sensor coil 123 and fourth set sensor coil 124 are arranged to be offset with respect to second set sensor coil 122 and third set sensor coil 123, respectively, in the vertical and horizontal directions in the plane of FIG. 8.

The reason that the set sensor coil group is selectively driven is as follows.

When a foreign object is present on the coil conductor that prescribes the external shapes of the unit sensor coils included in the set sensor coil, the foreign object detection device according to Embodiment 1 cannot detect this foreign object. Moreover, when a foreign object is present across both the unit sensor coil wound in the first winding direction and the unit sensor coil wound in the second winding direction, the foreign object detection device according to Embodiment 1 cannot detect this foreign object or the detection output of the foreign object detection device decreases. A purpose of foreign object detection device 127 according to the present embodiment is to detect a foreign object using at least one of second set sensor coil 122, third set sensor coil 123, and fourth set sensor coil 124 when this foreign object cannot be detected by driving first set sensor coil 121. Nevertheless, it may be possible that the foreign object still cannot be detected depending on the shape and location of the foreign object. However, the possibility that the foreign object cannot be detected can be reduced as compared with the case where there is only one sensor coil group.

It should be noted that the number of set sensor coils is not limited to four and may be at least two. A larger number of set sensor coils is considered to reduce the possibility that a foreign object cannot be detected. However, an excessive number of set sensor coils complicates the coil conductor wiring. In view of this, a well-balanced number of set sensor coils may be set.

In FIG. 8, first set sensor coil 121, second set sensor coil 122, third set sensor coil 123, and fourth set sensor coil 124 are arranged to be offset with respect to each other at equal intervals, each interval being a quarter of the size of the unit sensor coil. However, the amounts of offset may not be equal.

As with sensor coil group 60 shown in FIG. 5A, in each of first set sensor coil 121, second set sensor coil 122, third set sensor coil 123, and fourth set sensor coil 124, the number of unit sensor coils wound in the first winding direction is different from the number of unit sensor coils wound in the second winding direction. As in the case of sensor coil group 60 shown in FIG. 5A, each of the set sensor coils can have an equal number of unit sensor coils wound in the first winding direction and unit sensor coils wound in the second winding direction by adding a new sensor coil group, such as second sensor coil group shown in FIG. 3A or peripheral sensor coil group 51 shown in FIG. 4A.

Figure 9:
FIG. 9 is a diagram of a first variation of mapping of a foreign object detection device according to Embodiment 2.

FIG. 9 is a diagram of mapping of a first variation of the foreign object detection device according to Embodiment 2. The foreign object detection device in the present embodiment is different from foreign object detection device 127 shown in FIG. 8 in the arrangement of set sensor coils and unit sensor coils.

Set sensor coil group 130 includes four sensor coil groups. Unit sensor coils 131, 132, 133, and 134 belong to a first sensor coil group and are placed in a region assigned with "a" in FIG. 9. Unit sensor coils 135, 136, 137, and 138 belong to a second sensor coil group and are placed in a region assigned with "b" in FIG. 9. Unit sensor coils 139, 140, 141, and 142 belong to a third sensor coil group and are placed in a region assigned with "c" in FIG. 9. Unit sensor coils 143, 144, 145, and 146 belong to a fourth sensor coil group and are placed in a region assigned with "d" in FIG. 9.

The unit sensor coils that belong to one sensor coil group are continuously connected and electrically connected in series.

The sensor coil groups are selectively driven. The reason that the sensor coil groups are selectively driven is the same as the reason described for foreign object detection device 127 shown in FIG. 8.

It should be noted that Embodiment 1 may be applied to the foreign object detection device according to Embodiment 2.

Embodiment 3

Figure 10:
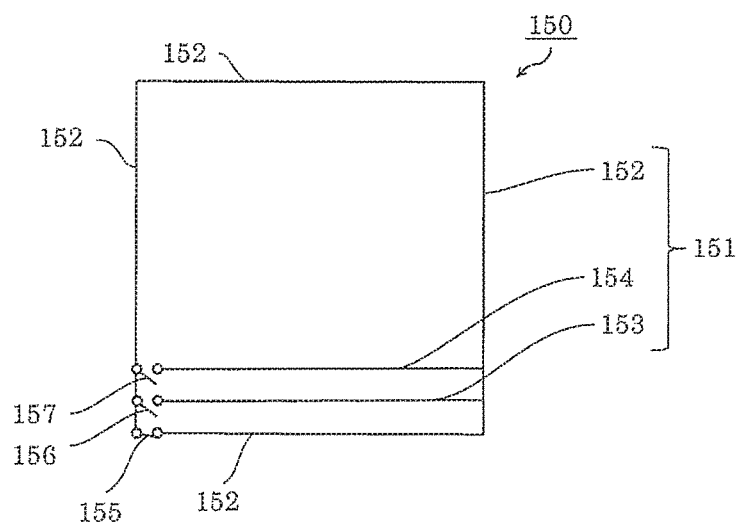
FIG. 10 is a conceptual diagram showing a unit sensor coil included in a foreign object detection device according to Embodiment 3.

FIG. 10 is a conceptual diagram showing a unit sensor coil included in a foreign object detection device according to Embodiment 3.

Unit sensor coil 150 includes coil conductor 151 and switches 155, 156, and 157. Coil conductor 151 includes reference conductor 152, first adjusting conductor 153, and second adjusting conductor 154. Reference conductor 152 is placed on the outermost periphery of unit sensor coil 150. First adjusting conductor 153 and second adjusting conductor 154 are placed to create shortcuts of reference conductor 152. Switch 155 is placed in reference conductor 152. Switch 156 is placed between reference conductor 152 and first adjusting conductor 153. Switch 157 is placed between reference conductor 152 and second adjusting conductor 154.

When switch 155 is closed (that is, turned "On") and switches 156 and 157 are opened (that is, turned "Off"), a closed loop formed as the unit sensor coil by reference conductor 152 induces an electromotive force as a result of a change in the external magnetic field.

When switch 156 is closed and switches 155 and 157 are opened, a closed loop formed as the unit sensor coil by reference conductor 152 and first adjusting conductor 153 induces an electromotive force as a result of a change in the external magnetic field. In this case, the area of the closed loop decreases and thus the absolute value of the electromotive force decreases as well.

When switch 157 is closed and switches 155 and 156 are opened, a closed loop formed as the unit sensor coil by reference conductor 152 and second adjusting conductor 154 induces an electromotive force as a result of a change in the external magnetic field. In this case, the area of the closed loop further decreases and thus the absolute value of the electromotive force further decreases as well.

In this way, unit sensor coil 150 according to the present embodiment can adjust the electromotive force by changing the size of the area. Unit sensor coil 150 according to the present embodiment can be applied to the foreign object detection device according to Embodiment 1 or 2. When no foreign object is present and the electromotive force of the set sensor coil still cannot be made 0 V in the foreign object detection device according to Embodiment 1 or 2, the application of unit sensor coil 150 according to the present embodiment can adjust the electromotive force of the set sensor coil. Unit sensor coil 150 according to the present embodiment may be applied to all the unit sensor coils included in the set sensor coil or to only some of the unit sensor coils. Switching among reference conductor 152, first adjusting conductor 153, and second adjusting conductor 154 is achieved by the three switches. However, this is not intended to be limiting.

It should be noted that Embodiment 3 may be applied to Embodiments 1 and 2.

Note that Embodiments 1 to 3 have in common that the shape of the unit sensor coil is not limited to a rectangle or a circle, and may be any other shape, such as any other polygon, an oval, or a fan-like shape.

Moreover, each of the foreign object detection devices according to Embodiments 1 to 3 determines the presence or absence of a foreign object by evaluating the voltage value changed due to the electromotive force. Thus, a current does not necessarily need to be applied.

In each of the foreign object detection devices according to Embodiments 1 to 3, the electromotive force of the unit sensor coil wound in the first winding direction and the electromotive force of the unit sensor coil wound in the second winding direction cancel each other out at least in part. Thus, the amount of current passing through the coil conductor in the presence of the foreign object can be reduced. With this, a loss due to the current flow can be reduced, and the electrical efficiency can be thus enhanced. Furthermore, since the amount of current flow is small, the coil conductor can be thin. This can inhibit an eddy current in the coil conductor induced by the external magnetic field. Thus, an eddy-current loss can be reduced, and the amount of heat generation of the coil conductor can also be reduced.

Reference Example 1

When the number of unit sensor coils is large, it is difficult in some cases to decide an optimum shape, arrangement, and sign for the unit sensor coils in a manner to minimize the electromotive force of a set sensor coil as a whole, that is, minimize an output voltage V0.

Here, a single assembly of unit sensor coils is defined as a sensor coil array. The external shapes of a plurality of unit sensor coils that belong to the single sensor coil array may be prescribed by a plurality of coil conductors instead of a single coil conductor. When the unit sensor coils are referred to as the single assembly, the unit sensor coils are a continuous assembly.

One method to easily form a sensor coil array is as follows. To minimize the output voltage V0, a region of the sensor coil array is divided and one of the divisions is formed as a unit sensor coil group. This group is then used as one unit for which the shape, arrangement, and sign are decided to minimize the output voltage V0. Then, the sensor coil array can be easily formed by repeatedly forming this unit sensor coil group. Hereinafter, this unit sensor coil group is referred to as a unit V0 reduction coil.

Figure 11:
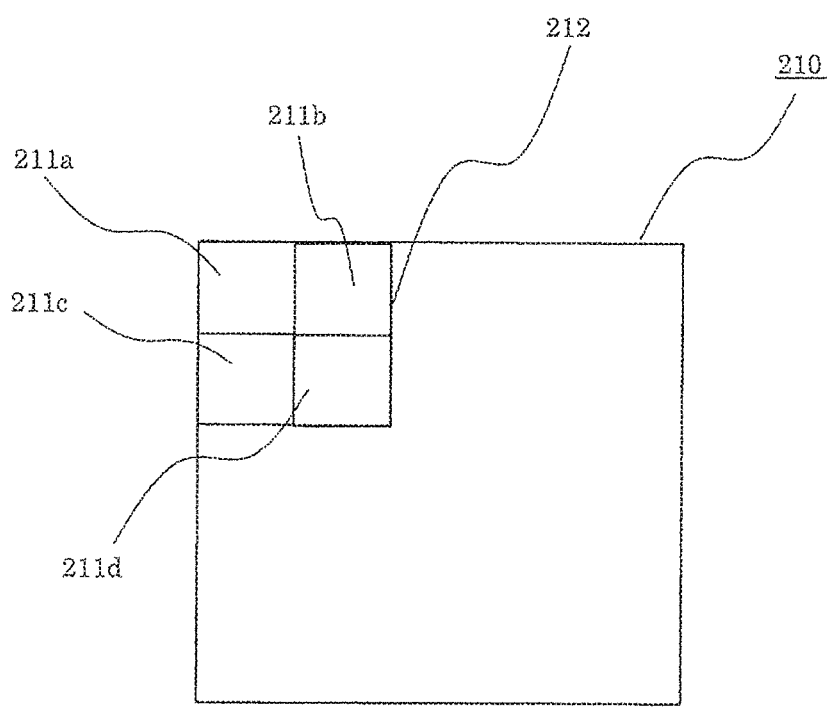
FIG. 11 is an illustrative diagram of a square unit V0 reduction coil according to Reference Example 1.

FIG. 11 is an illustrative diagram of a square unit V0 reduction coil according to Reference Example 1.

Sensor coil array 210 includes a plurality of unit V0 reduction coils 212. Unit V0 reduction coil 212 includes four unit sensor coils 211a to 211d. To be more specific, unit V0 reduction coil 212 includes two unit sensor coils in the X direction and two unit sensor coils in the Y direction, that is, four unit sensor coils 211a, 211b, 211c, and 211d in total. By a combination of the electromotive forces of these four unit sensor coils, the output voltage V0 of unit V0 reduction coil 212 can be reduced.

Unit V0 reduction coil 212 is placed repeatedly in the X direction in such a manner to fill the sensor coil array. Moreover, unit V0 reduction coil 212 is placed repeatedly in the Y direction as well. It should be noted that FIG. 11 shows only unit V0 reduction coil 212 placed at the uppermost and leftmost corner.

With this, as the electromotive force of unit V0 reduction coil 212 can be reduced, the output voltage V0 of sensor coil array 210 can also be easily reduced.

Here, any number of unit sensor coils may be included in unit V0 reduction coil 212. Moreover, any number of unit sensor coils may be placed in the X direction, and any number of unit sensor coils may be placed in the Y direction.

Furthermore, the output voltage V0 may be reduced for each of the unit sensor coil groups in the Y direction. For example, the electromotive forces of unit sensor coils 211a and 211c may cancel each other out. Alternatively, the electromotive forces of unit sensor coils 211b and 211d may cancel each other out.

Similarly, the output voltage V0 may be reduced for each of the unit sensor coil groups in the X direction. With this, the design for reducing the output voltage V0 of the sensor coil array can be easily achieved.

Figure 12:
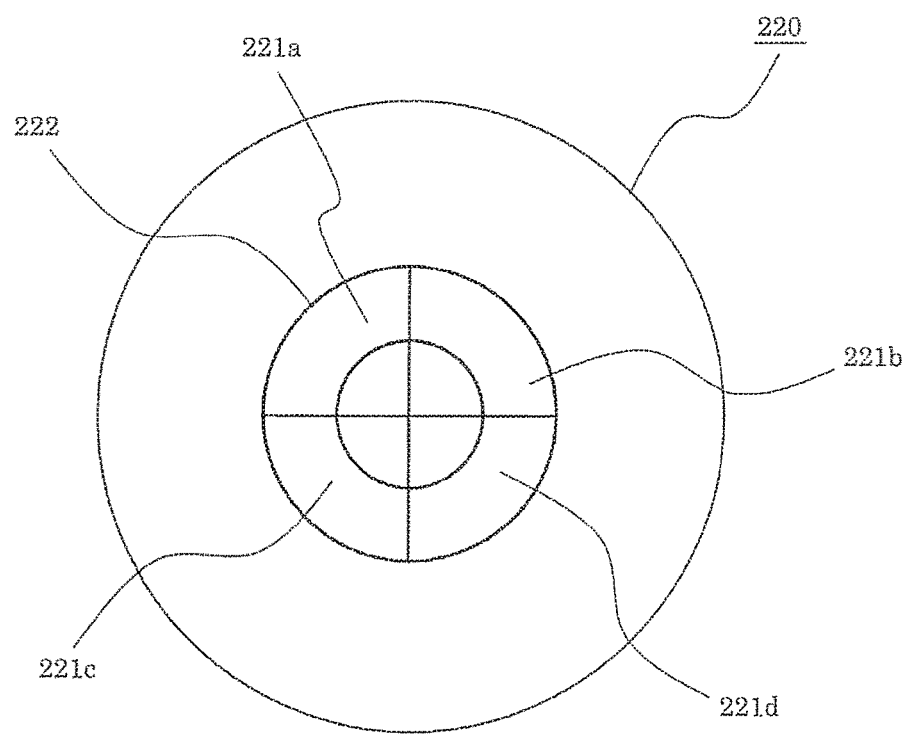
FIG. 12 is an illustrative diagram of a circular unit V0 reduction coil according to Reference Example 1.

FIG. 12 is an illustrative diagram of a circular unit V0 reduction coil according to Reference Example 1.

This reference example is suitable for a spiral power-receiving coil.

Sensor coil array 220 includes a plurality of unit V0 reduction coils 222. Unit V0 reduction coil 222 includes four unit sensor coils 221a, 221b, 221c, and 221d.

To reduce the electromotive force of unit V0 reduction coil 222, the sum of electromotive forces of the four unit sensor coils 221a to 221d is reduced by adjusting the signs and magnitudes of the electromotive forces. For example, assume that the electromotive forces of unit sensor coils 221a and 221d have the positive sign and the same magnitude, and that the electromotive forces of unit sensor coils 221c and 221b have the negative sign and the same magnitude. Here, by combining unit sensor coils 221a to 221d, the electromotive force of unit V0 reduction coil 222 can be thus reduced.

Unit V0 reduction coil 222 is in the shape of a doughnut. Unit V0 reduction coil 222 is divided into quarters along the diameters in the X and Y directions as the boundaries, thereby forming four unit sensor coils.

A plurality of unit V0 reduction coils 222 are placed in such a manner to fill sensor coil array 220 along the extended diameter. Note that FIG. 12 shows only one unit V0 reduction coil 222.

The unit V0 reduction coil placed in a central portion of sensor coil array 220 is not in the shape of a doughnut, but in the shape of a circle having no space in the center to fill the entire region of sensor coil array 220.

It should be noted that doughnut-shaped unit V0 reduction coil 222 may be divided into any number of portions. Moreover, the width of unit V0 reduction coil 222 in the radial direction may not be constant. In other words, the width of the unit sensor coil in the radial direction may not be constant.

For example, to make the areas of the unit sensor coils equal in size, the width of the unit sensor coil placed farther from the central portion is made shorter in the radial direction.

Moreover, when a spiral coil that generates a magnetic field in a plane parallel to the XY plane is present, a region having zero magnetic field in the Z direction exists and the contour of this region is a circle. When the circumferential boundary of unit V0 reduction coil 222 adjacent to this contour coincides with this contour, the electromotive force can be reduced close to 0 V.

Here, when a foreign object that has almost the same size as the unit V0 reduction coil is present, the detection sensitivity may decrease in some cases.

Figure 13:
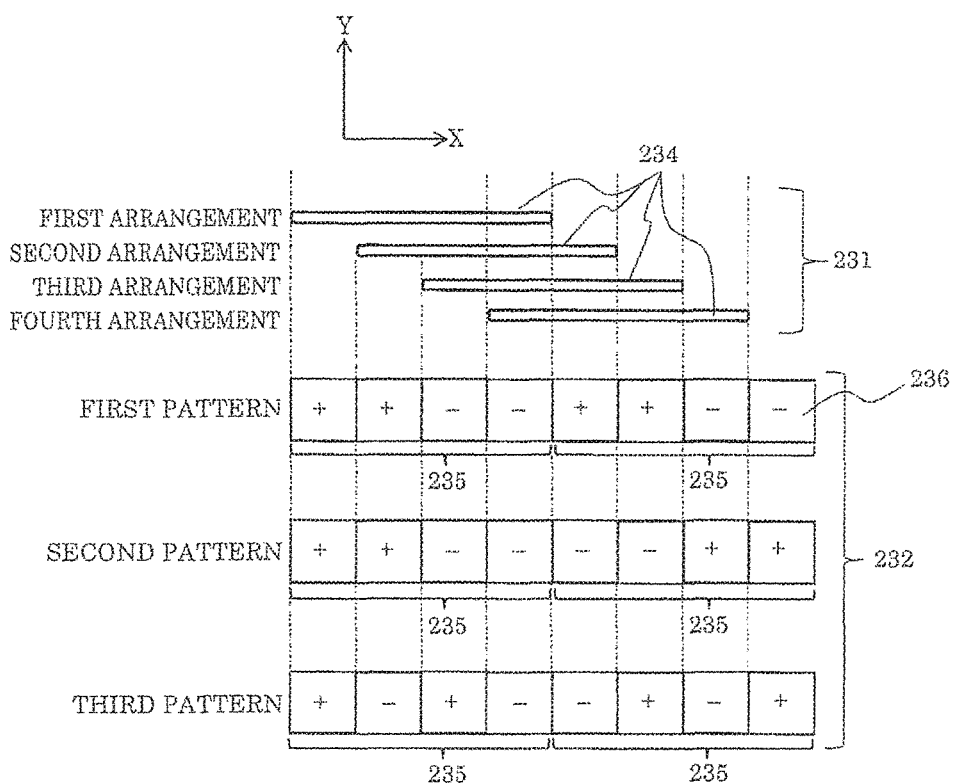
FIG. 13 is an illustrative diagram of a positional relationship between a unit V0 reduction coil and a foreign object, according to Reference Example 1.

FIG. 13 is an illustrative diagram of a positional relationship between a unit V0 reduction coil and a foreign object, according to Reference Example 1. FIG. 14 is a diagram showing sensitivity evaluation according to Reference Example 1. With reference to FIG. 13 and FIG. 14, the following describes a method of improving dependence of the foreign object detection sensitivity on the size and location of the foreign object using the unit V0 reduction coil that includes square unit sensor coils.

Foreign object arrangement 231 in FIG. 13 shows four locations of rod-like foreign object 234. In FIG. 13, only for the sake of simplicity, a first arrangement, a second arrangement, a third arrangement, and a fourth arrangement are illustrated as being displaced with respect to each other in the Y direction as well. In reality, however, these four arrangements have the same coordinate position in the Y direction and are different in location only in the X direction. The length of foreign object 234 is equal to the length of unit V0 reduction coil 235 in the X direction.

Unit V0 reduction coil 235 includes four unit sensor coils 236 in the X direction and one unit sensor coil 236 in the Y direction. The sign of unit sensor coil 236 indicates a sign of the electromotive force at a certain moment. In each of unit V0 reduction coils 235, the number of positive unit sensor coils 236 is equal to the number of negative unit sensor coils 236.

Sign pattern 232 includes a first pattern, a second pattern, and a third pattern. In these patterns, two unit V0 reduction coils 235 are arranged in the X direction, and arrangement of signs of unit sensor coils 236 are different for each of the patterns.

FIG. 14 shows results of relative evaluation of the foreign object detection sensitivity, by combinations of the first to fourth arrangements of foreign object 234 and the first to third patterns of the sign arrangements of unit sensor coils 236.

The first to third patterns are described as follows.

In the first pattern, unit V0 reduction coil 235 includes the following: two positive unit sensor coils 236 that are adjacent to each other; and two negative unit sensor coils 236 that are adjacent to each other. In addition, two unit V0 reduction coils 235 have the same sign arrangement of unit sensor coils 236.

In the second pattern, unit V0 reduction coil 235 on the left-hand side is the same as in the first pattern. The sign arrangement of unit V0 reduction coil 235 on the right-hand side and the sign arrangement of unit V0 reduction coil 235 on the left-hand side are mirror images of each other in the X direction with respect to the boundary between these two unit V0 reduction coils 235.

In the third pattern, signs of adjacent unit sensor coils 236 of unit V0 reduction coil 235 on the left-hand side are different from each other. Moreover, the sign arrangement of unit V0 reduction coil 235 on the left-hand side is a mirror image of the right-hand side as in the second pattern.

The electromotive force of unit sensor coil 236 present in the location where foreign object 234 is placed changes. Using two unit V0 reduction coils 235, the sensitivity is relatively evaluated based on the signs and number of unit sensor coils 236 having the varied electromotive forces.

Assume that the sum of electromotive forces of positive unit sensor coil 236 and negative unit sensor coil 236, in both of which the electromotive forces vary, is zero when no foreign object is present. The foreign object detection sensitivity is considered to be higher when a difference between the numbers of positive and negative signs is larger. Note that when the difference between the numbers of positive and negative signs is one or more, the sensitivity is evaluated as good, which is indicated as "○". Note also that when the difference is zero, the sensitivity is evaluated as poor, which is indicated as "x"

An explanation is provided with reference to FIG. 14 as follows.

In the first pattern, the numbers of positive and negative unit sensor coils 236 placed in the locations having the foreign object are equal, in all of the first to fourth arrangements of the foreign object. Thus, the difference between the numbers of signs is zero, thereby resulting in "x" which indicates that the foreign object detection is difficult.

The results of the second pattern are "x" only in the first arrangement and "○" in the second to fourth arrangements.

The results of the third pattern are "x" in the first and third arrangements and "○" in the second and fourth arrangements.

In FIG. 14, overall sensitivity evaluation is made in consideration of the above evaluation results of the first to fourth arrangements. More specifically, "x" is given to the first pattern that has the lowest evaluation, "○" is given to the second pattern that has the highest evaluation, and "Δ" is given to the third pattern that has the medium evaluation.

As can be understood from the results, the second pattern is the most favorable pattern. To be more specific, unit sensor coils 236 included in unit V0 reduction coil 235 may be arranged in such a manner that the sign arrangements of adjacent unit V0 reduction coils 235 are mirror images of each other with respect to the boundary between these adjacent unit V0 reduction coils. With this, the sensitivity performance can be enhanced by reducing stochastically the locations where the foreign object detection sensitivity decreases depending on a specific size and shape of the foreign object.

Reference Example 1 describes an example in which unit V0 reduction coil 235 includes four unit sensor coils 236 in the X direction and one unit sensor coil 236 in the Y direction. However, this example is not intended to be limiting. Any number of unit sensor coils may be placed in the X and Y directions. The same advantageous effect can be obtained by applying the above-described method. When the number of unit sensor coils 236 in the Y direction is two or more, unit sensor coils 236 may be arranged in such a manner that the sign arrangements of unit V0 reduction coils 235 adjacent to each other in the Y direction are mirror images of each other in the Y direction with respect to the boundary between unit V0 reduction coils 235. In this case, the same advantageous effect can be obtained as well.

In Reference Example 1, the outputs of the sensor coil arrays need to be detected. As a specific method, these sensor coil arrays may be electrically connected in series, or electrically connected in parallel.

Reference Example 2

When electromotive forces of adjacent unit sensor coils are of opposite directions, the sensitivity to detect a foreign object present above a conducting wire that is the boundary between these unit sensor coils decreases. The reason for this is as follows. The foreign object present on both sides of the boundary causes changes to both the electromotive forces of the unit sensor coils. Such changes cause the sign of the electromotive force of one of the unit sensor coils and the sign of the electromotive force of the other one of unit sensor coils to be opposite to each other, thereby reducing the sum of the electromotive forces of these unit sensor coils.

As a means to solve the above problem, a method of displacing a plurality of set sensor coils with respect to each other in the X and Y directions is described below.

Figure 15:
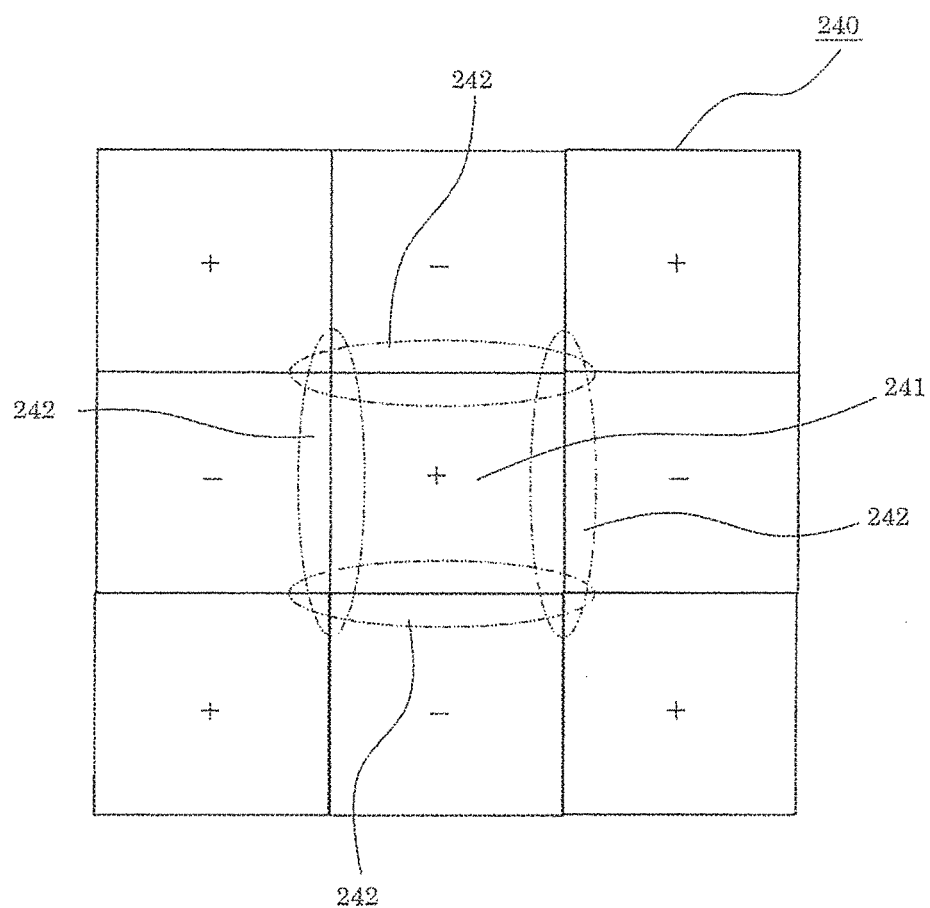
FIG. 15 is an illustrative diagram of low-sensitivity regions of a unit sensor coil according to Reference Example 2.

FIG. 15 is an illustrative diagram of low-sensitivity regions of a unit sensor coil according to Reference Example 2.

FIG. 15 shows the following: set sensor coil 240 that includes a square unit sensor coil; low-sensitivity region 242 in which the foreign object detection sensitivity decreases; and unit sensor coil 241 focused on for the sake of explanation. The adjacent unit sensor coils have the electromotive forces that are opposite in direction to each other, and this diagram shows the positive and negative signs of the unit sensor coils at a certain moment.

The sign of the electromotive force of unit sensor coil 241 is positive and all the signs of the electromotive forces of the unit sensor coils adjacent to unit sensor coil 241 are negative. All four sides, i.e., all conducting wires, of unit sensor coil 241 focused on are low-sensitivity regions 242. When, on the other hand, the sign of the electromotive force of unit sensor coil 241 is negative and all the signs of the electromotive forces of the unit sensor coils adjacent to unit sensor coil 241 are positive, low-sensitivity regions are also present similarly. To be more specific, when the unit sensor coils are arranged with no space in between in this way, the sensitivity to detect a foreign object present on any of the sides, except for the sides of the surrounding unit sensor coils, decreases.

Figure 16:
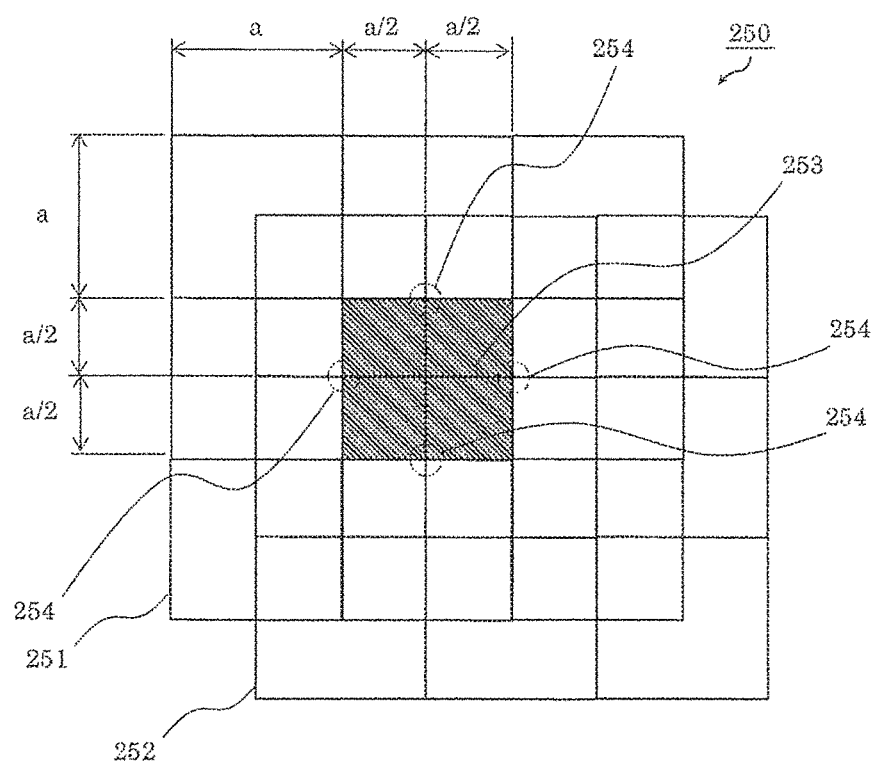
FIG. 16 is an illustrative diagram of two square multi sensor coils according to Reference Example 2.

FIG. 16 is an illustrative diagram of two square multi sensor coils according to Reference Example 2. FIG. 16 shows multi sensor coil 250 which is of a double-coil type. Multi sensor coil 250 includes two unit sensor coils, which are set sensor coils 251 and 252. Each of the set sensor coils includes three unit sensor coils in the X direction and three unit sensor coils in the Y direction. These two set sensor coils are displaced with respect to each other in the X and Y directions.

In FIG. 16, each of set sensor coils 251 and 252 includes the square unit sensor coils each of which has length a for each side. Set sensor coils 251 and 252 are displaced with respect to each other by a length of a/2 in the X and Y directions. Each of set sensor coils 251 and 252 has the same configuration as set sensor coil 240 shown in FIG. 15.

With the multi sensor coil method, the use of a plurality of set sensor coils can reduce the area of the low-sensitivity region. This is based on the idea that even when one of the set sensor coils has a low-sensitivity region, a foreign object present in this region can be detected using the other set sensor coils.

In FIG. 16, unit sensor coil 253 located in the center of set sensor coil 251 is hatched. In unit sensor coil 253, low-sensitivity region 254 is present in each side in the shape of a dot. Since the portion other than the low-sensitivity region 254 in each side is not a low-sensitivity region for the other unit sensor coils, detection can be made for this portion. Low-sensitivity region 254 is present on the side of unit sensor coil 253 that belongs to set sensor coil 251 and on the side of the unit sensor coil that belongs to set sensor coil 252. These sides cross each other, and thus the shape of the low-sensitivity region is close to a dot or a circle. The same holds for the other unit sensor coils.

As compared with set sensor coil 240 that does not apply the multi sensor coil method, it can be understood that the size of low-sensitivity region 254 of multi sensor coil 250 is significantly reduced.

Figure 17:
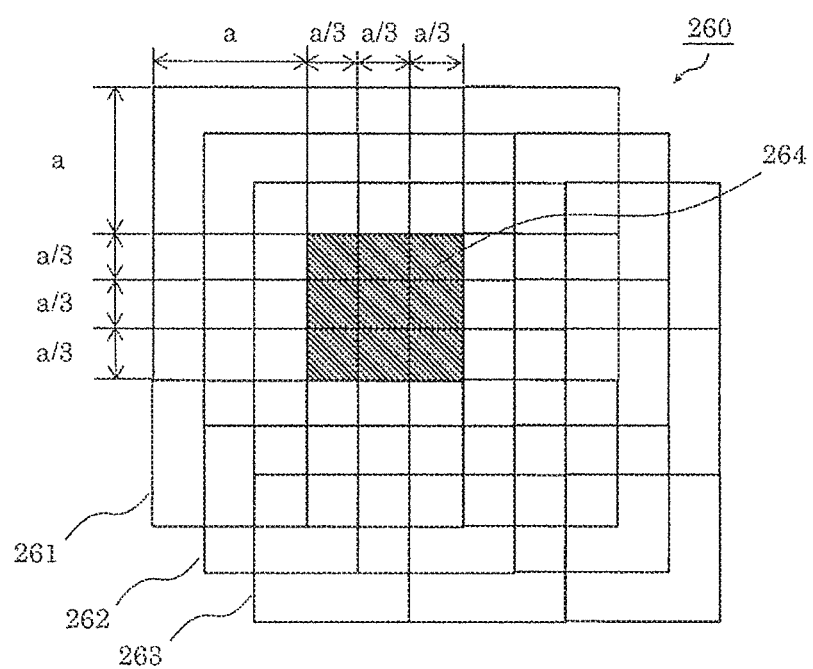
FIG. 17 is an illustrative diagram of three square multi sensor coils according to Reference Example 2.

FIG. 17 is an illustrative diagram of three square multi sensor coils according to Reference Example 2. FIG. 17 shows multi sensor coil 260 that includes three set sensor coils 261, 262, and 263. Each shape of the set sensor coils is the same as the shape shown in FIG. 16. Three set sensor coils 261, 262, and 263 are displaced with respect to each other by a length equal to one-third of the side length a of the unit sensor coil.

In FIG. 17, unit sensor coil 264 located in the center of set sensor coil 261 is hatched. In unit sensor coil 264, all of the sides have no low-sensitivity region. This is because set sensor coils 261, 262, and 263 have no portions that overlap each other in any side. Thus, when a multi sensor coil includes three set sensor coils, low-sensitivity regions can be completely eliminated from the sides of the unit sensor coils. The same holds for the case where four or more set sensor coils are included.

According to the reference examples shown in FIG. 16 and FIG. 17, the set sensor coils are displaced with respect to each other by an evenly divided length of the side of the unit sensor coil. However, this is not intended to be limiting. The length may not correspond to an evenly divided length.

Moreover, although the lengths of displacements are equal in the X and Y directions according to the reference examples, the lengths may be different in these directions. Furthermore, the displacement may be made only in the X or Y direction.

With consideration of the location of the foreign object to be detected and the distribution profile of the external magnetic field, an advantageous effect of minimizing the area of low-sensitivity region can be obtained through the multi sensor coil method.

The multi sensor coil method can be applied to a doughnut-shaped sensor coil, and thus can reduce or completely eliminate the area of the low-sensitivity region.

Figure 18:
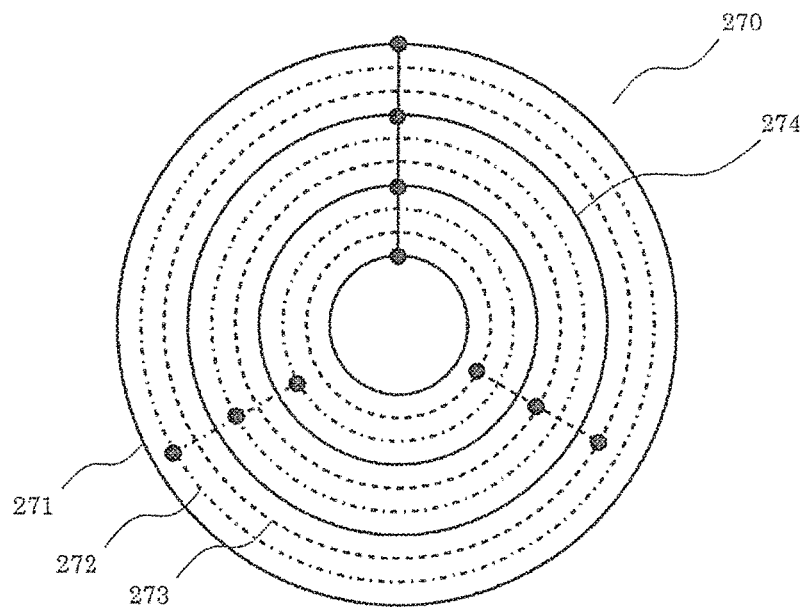
FIG. 18 is an illustrative diagram of three circular multi sensor coils according to Reference Example 2.

FIG. 18 is an illustrative diagram of three circular multi sensor coils according to Reference Example 2.

FIG. 18 shows a reference example of multi sensor coil 270 that is formed using three set sensor coils 271, 272, and 273 each of which includes circular, doughnut-shaped unit sensor coils. Multi sensor coil 270 shown in FIG. 18 is suitable for the case where a power receiving device of a wireless charging system includes a spiral coil. For ease of understanding, circular dots are drawn on intersection points of the radial and circumferential directions in one set sensor coil. Moreover, for ease of viewing, set sensor coil 271 is indicated by a solid line, set sensor coil 272 by a dashed-dotted line, and set sensor coil 273 by a dashed line.

Each of three set sensor coils 271, 272, and 273 has a straight line extending outward from the center of the circle to form a doughnut-shaped closed unit sensor coil. Unit sensor coil 274 that belongs to set sensor coil 271 focused on here is located in the middle among the three unit sensor coils included in set sensor coil 271. The entire regions of all sides forming unit sensor coil 274 includes no portion in which any one of the other two set sensor coils 271 and 272 coincides with unit sensor coil 274. In other words, no low-sensitivity region exists.

As with the aforementioned case of the multi sensor coil that includes the square unit sensor coils, when the unit sensor coils are in the circular, doughnut shape, the region in which the sensitivity to detect a foreign object present on the side is low can also be eliminated by forming the multi sensor coil using three or more set sensor coils.

It should be noted that the technique according to Reference Example 2 can be applied to the foreign object detection devices according to Embodiments 1 to 3.

Reference Example 3

Hereinafter, timing at which foreign object detection is performed using a detection circuit is described.

Foreign object detection is performed before the start of power supply, during power supply, and after the end of power supply. During power supply, foreign object detection may be performed continuously or intermittently. When an interval between foreign object detections is too short, an increase in power consumption leads to a problem. On this account, a reasonable periodic interval that causes no problems is required.

Here, when a foreign object is present, the temperature rise time of the foreign object is determined by the size and frequency of the external magnetic field of the location of the foreign object and by the material properties and shape of the foreign object, for example. A disadvantage caused by the presence of a foreign object is temperature rise. In EV (electric vehicle) application, a short temperature rise time is of the order of several seconds. Thus, foreign object detection needs to be performed at intervals of at least below several seconds. To respond to the temperature rise well in advance, it is desirable to perform foreign object detection at intervals of about 1 ms.

Next, the following describes timing in the cycle at which foreign object detection is performed to avoid external magnetic field effect.

Figure 19:
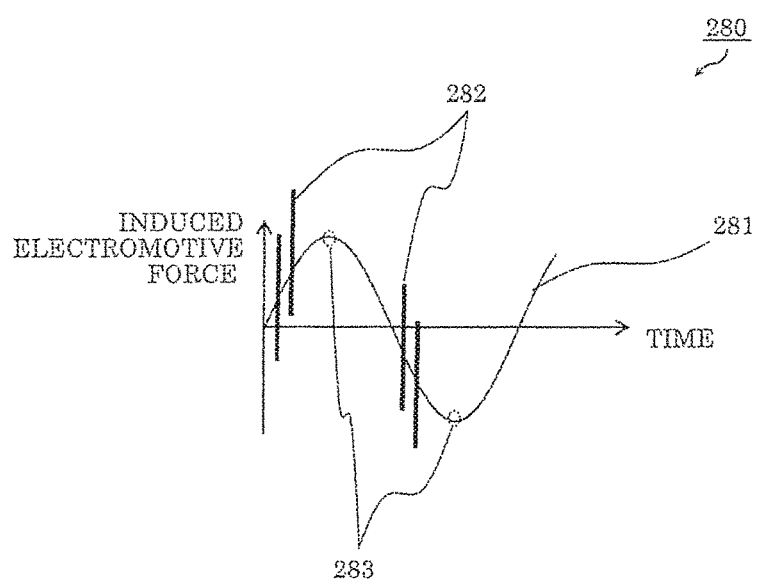
FIG. 19 is a diagram showing measured waveforms of flux change of a wireless charging device according to Reference Example 3.

FIG. 19 is a diagram showing measured waveforms of flux change of a wireless charging device according to Reference Example 3.

In FIG. 19, magnetic field change caused by a power receiving coil operating at several kW and 100 kHz is shown as induced electromotive force waveform 280 that is obtained by measuring the induced electromotive force using a search coil.

A sinusoidal current passes through the power receiving coil. Induced electromotive force 281 caused by the change in the magnetic field generated by this current is in the shape of a sinusoidal waveform. High frequency noise 282 is caused by switching between an inverter circuit and a rectifier circuit of the power receiving coil and is at several tens of MHz or more. Electromotive force peak period 283 is a period during which the induced electromotive force reaches a peak.

The search coil used in the measurement is the same as a sensor coil in principle. When receiving a high frequency electromagnetic noise, the search coil is influenced by noise similar to high frequency noise 282. Thus, the noise is added to the electromotive force of the sensor coil, and this results in voltage fluctuations. As a result, a false detection is caused. In addition, to avoid the false detection, the sensitivity performance of foreign object detection needs to be reduced eventually.

In view of this, foreign object detection is performed at timing to avoid a period in which high frequency noise 282 is caused. With this, a high frequency noise can be thus avoided. Furthermore, when the sensor coil is driven using the magnetic field caused by the power receiving coil, foreign object detection may be performed in electromotive force peak period 283 in which flux change reaches a maximum.

Timing information may be obtained from, for example, information as to inverter driving timing of a primary-side device.

Here, the magnetic field change reaches a maximum when the current of the power receiving coil is zero. On this account, the timing may be obtained by detecting the current of the power receiving coil and then detecting a zero current. Furthermore, a search coil that detects the magnetic field generated by the power receiving coil may be provided. With this, the timing of electromotive force peak period 283 may be obtained. In this case, the search coil may be formed on a sensor coil array substrate.

Moreover, instead of using the search coil, the change in the external magnetic field may be measured using a sensor coil to obtain the timing.

The timing may be obtained as follows by detecting the current of the power receiving coil. On the basis of information as to currents and phases of both the primary-side and secondary-side devices, magnetic flux of a location where the sensor coil array that performs foreign object detection is disposed may be calculated. Then, the timing at which the magnetic flux change reaches a maximum may be calculated.

The present reference example can be applied to the foreign object detection devices according to Embodiments 1 to 3.

Reference Example 4

One method of enhancing the sensitivity of a foreign object detection device is to increase an output of a sensor coil group. The following describes a specific example of such a method.

Figure 20:
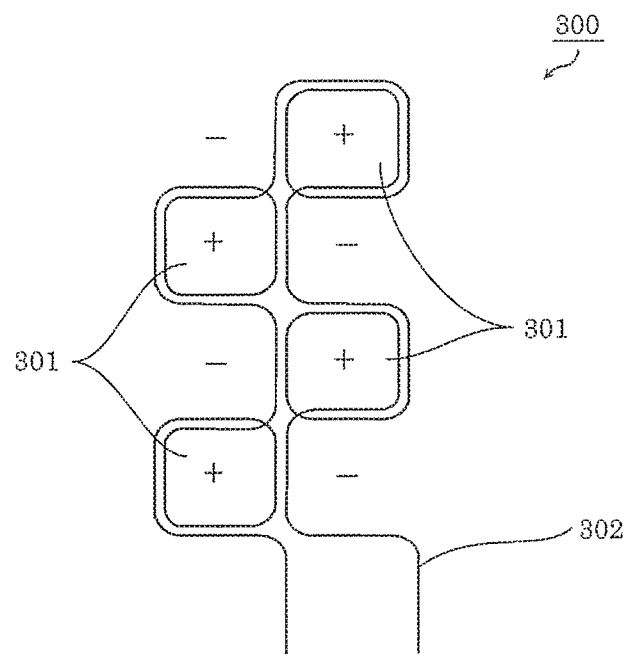
FIG. 20 is a conceptual diagram of a sensor coil group according to Reference Example 4.
Figure 21:
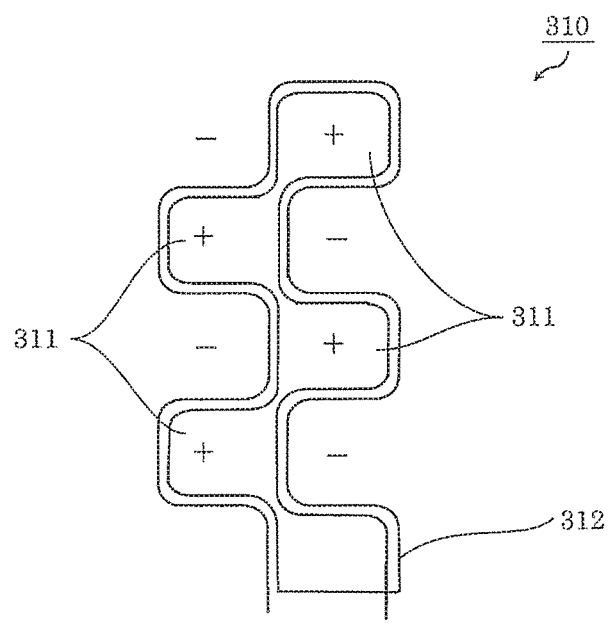
FIG. 21 is another conceptual diagram of a sensor coil group according to Reference Example 4.

FIG. 20 is a conceptual diagram of a sensor coil group according to Reference Example 4. FIG. 21 is another conceptual diagram of a sensor coil group according to Reference Example 4. In the diagrams, "+" indicates that the unit sensor coil in the present location is wound in the first winding direction and "−" indicates that the unit sensor coil, if present, in the present location would be wound in the second winding direction.

In FIG. 20, sensor coil group 300 includes a plurality of unit sensor coils 301. Coil conductors 312 prescribe the external shapes of unit sensor coils 301, and are continuously and electrically connected in series. Each of unit sensor coils 301 is doubly wound by coil conductor 302. In this way, double windings may be provided in a unit of a unit sensor coil. It should be obvious that the number of windings is not limited to two and may be three or more. A circuit that measures the electromotive force is connected to an end portion of coil conductor 302 shown in the lower portion in the diagram. Thus, the unit sensor coil shown in the lower portion in the diagram is electrically closer to the circuit that measures the electromotive force, and the unit sensor coil shown in the upper portion in the diagram is electrically far away from the circuit.

In FIG. 21, sensor coil group 310 includes a plurality of unit sensor coils 311. Coil conductors 312 prescribe the external shapes of unit sensor coils 311, and are continuously and electrically connected in series. Sensor coil group 310 is doubly wound. In this way, double windings may be provided in a unit of a sensor coil group. Furthermore, double windings may be provided in a unit of a set sensor coil. It should be obvious that the number of windings is not limited to two and may be three or more. A circuit that measures the electromotive force is connected to an end portion of coil conductor 312 shown in the lower portion in the diagram. Thus, the unit sensor coil shown in the lower portion in the diagram is electrically closer to the circuit that measures the electromotive force, and the unit sensor coil shown in the upper portion in the diagram is electrically far away from the circuit.

Instead of providing multiple windings in a unit of a unit sensor coil, it is preferable to provide multiple windings in a unit of a sensor coil group or a set sensor coil. This is because, in this case, a signal transmission time in the presence of a foreign object is shorter. When the size of a sensor coil group is large and the number of windings is great, the length of the coil conductor needs to be long. This results in a delay in the signal voltage of the electromotive force due to the presence of the foreign object. As a result of this, the electromotive force value decreases and thus the detection sensitivity is reduced. In view of this, when the length of the coil conductor is 10 m or more, it is preferable to provide multiple windings in a unit of a sensor coil group as shown in FIG. 21 or in a unit of a set sensor coil. When the length of the coil conductor is relatively short, multiple windings may be provided in a unit of a unit sensor coil.

The technique according to Reference Example 4 can be applied to Embodiments 1 to 3 and Reference Examples 1 to 3.

Reference Example 5

In a unit sensor coil provided with multiple windings, a voltage of a side having no adjacent unit sensor coil increases. This leads to a problem of pressure resistance. A method to solve this problem is described below.

Figure 22A:
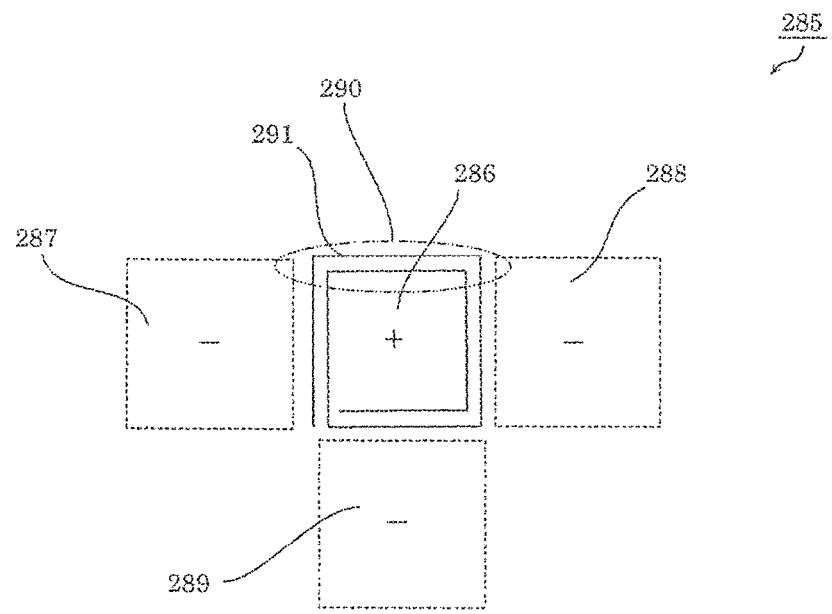
FIG. 22A is a diagram of a unit sensor coil before improvement according to Reference Example 5.
Figure 22B:
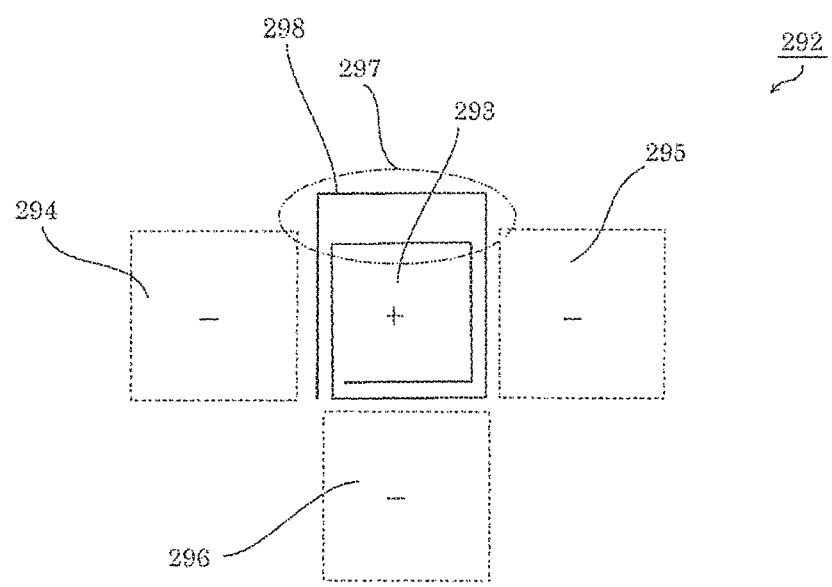
FIG. 22B is a diagram of a unit sensor coil after improvement according to Reference Example 5.

FIG. 22A is a diagram of a unit sensor coil before improvement according to Reference Example 5. FIG. 22B is a diagram of a unit sensor coil after improvement according to Reference Example 5.

In FIG. 22A, set sensor coil 285 includes a plurality of unit sensor coils. As a part of the plurality of unit sensor coils, unit sensor coils 286, 287, 288, and 289 are included. Each of these unit sensor coils is wound by a coil multiple times. The external shape of set sensor coil 285 is prescribed by coil conductor 291. In FIG. 22A, unit sensor coil 286 are adjacent to unit sensor coils 287, 288, and 289 located on the left, right, and below, respectively, as viewed in this diagram. Thus, coil conductor 291 includes portions which are adjacent to unit sensor coils 287, 288, and 289 and which thus also function as the coil conductors of these unit sensor coils. However, coil conductor 291 located in the upper portion as viewed in FIG. 22A has no adjacent unit sensor coil. This area is referred to as single conductor area 290.

The voltage of the side of coil conductor 291, the side having an adjacent unit sensor coil, that is, the side being located on the boundary between two unit sensor coils, is reduced by the electromotive forces of the two unit sensor coils. However, the voltage of single conductor area 290 of coil conductor 291 increases since no unit sensor coil is present adjacent to this area Set sensor coil 292 shown in FIG. 22B is one form that solves this problem. In FIG. 22B, set sensor coil 292 includes a plurality of unit sensor coils. As a part of the plurality of unit sensor coils, unit sensor coils 293, 294, 295, and 296 are included. Each of these unit sensor coils is wound by a coil multiple times. The external shape of unit sensor coil 293 is prescribed by coil conductor 298. Coil conductor 298 of set sensor coil 292 in FIG. 22B includes a portion that has no adjacent unit sensor coil, and this portion is referred to as single conductor area 297 as in FIG. 22A.

In single conductor area 297, the pressure resistance between wires can be increased by increasing a space between windings of coil conductor 298.

In particular, a unit sensor coil disposed in a region having a large external magnetic field has a problem of the pressure resistance of the windings. On this account, in the unit sensor coil in this region, the space between the windings of the side having no adjacent unit sensor coil may be increased.

The technique according to Reference Example 5 can be applied to Embodiments 1 to 3 and Reference Examples 1 to 4.

Other Embodiments

It should be noted that the foreign object detection device according to the present disclosure is not limited to Embodiments 1 to 3. The present invention includes other embodiments implemented through a combination of arbitrary components of Embodiments 1 to 3, modifications obtained through the application of various modifications to the embodiments that may be conceived by a person of ordinary skill in the art and that do not depart from the essence of the present invention, or various devices in which the foreign object detection device according to the embodiments is built into.

INDUSTRIAL APPLICABILITY

The foreign object detection device according to the present invention can be applied to a foreign object detection device of a wireless charging system.

The invention claimed is:

1. A foreign object detection device comprising:
a set sensor coil; and
a determination device that detects a foreign object, based on an electromotive force of the set sensor coil,
wherein the set sensor coil includes at least one sensor coil group,
the at least one sensor coil group includes, electrically connected in series: a plurality of unit sensor coils that are wound in a first winding direction; and a plurality of unit sensor coils that are wound in a second winding direction, between the plurality of unit sensor coils that are wound in the first winding direction,
the plurality of unit sensor coils that are wound in the first winding direction generate a first-sign electromotive force that causes a current to flow in a first direction in response to a change in an external magnetic field in which magnetic field distribution is uniform,
the plurality of unit sensor coils that are wound in the second winding direction generate a second-sign electromotive force that causes a current to flow in a second direction opposite to the first direction in response to the change in the external magnetic field,
each of the plurality of unit sensor coils has a coil conductor that prescribes an external shape of the unit sensor coil,
a plurality of the coil conductors included in the at least one sensor coil group are continuously and electrically connected in series, and a part or a whole of the coil conductor forming the unit sensor coil wound in the first winding direction is a part or a whole of the coil conductor forming the unit sensor coil wound in the second winding direction, and
an external shape of each of the plurality of unit sensor coils that are wound in the second winding direction is prescribed when the coil conductor of each of the plurality of unit sensor coils that are wound in the first winding direction prescribes the external shape of the unit sensor coil.

2. The foreign object detection device according to claim 1,
wherein the set sensor coil includes a plurality of sensor coil groups.

3. The foreign object detection device according to claim 2,
wherein the plurality of sensor coil groups are electrically connected in series.

4. The foreign object detection device according to claim 2,
wherein the determination device obtains the electromotive force of the set sensor coil by separately calculating an electromotive force for each of the plurality of the sensor coil groups.

5. The foreign object detection device according to claim 2,
wherein a sum of areas of the plurality of unit sensor coils wound in the first winding direction is equal to a sum of areas of the plurality of unit sensor coils wound in the second winding direction.

6. The foreign object detection device according to claim 2,
wherein the plurality of sensor coil groups include:
a first sensor coil group; and
a peripheral sensor coil group,
the first sensor coil group includes:
the plurality of unit sensor coils wound in the first winding direction; and
the plurality of unit sensor coils wound in the second winding direction,
the peripheral sensor coil group includes
at least one of (i) one or more peripheral unit sensor coils wound in the first winding direction and (ii) one or more peripheral unit sensor coils wound in the second winding direction, and
the one or more peripheral unit sensor coils are disposed in regions in which the plurality of unit sensor coils are absent in an outermost peripheral portion of the set sensor coil.

7. The foreign object detection device according to claim 1,
wherein the sensor coil group includes a plurality of Y-axis-direction sensor coil groups, each of which includes one or more of the unit sensor coils that are wound in the first winding direction and are arranged in a Y axis direction,
the plurality of Y-axis-direction sensor coil groups are arranged side by side in an X axis direction that crosses the Y axis direction,
at least one of the plurality of Y-axis-direction sensor coil groups includes a plurality of the unit sensor coils,
the coil conductors are electrically connected in series so that peripheries of the plurality of Y-axis-direction sensor coil groups are continuous, and
the coil conductors forming two adjacent Y-axis-direction sensor coil groups among the plurality of Y-axis-direction sensor coil groups are continuously and electrically connected in series.

8. The foreign object detection device according to claim 7, wherein each of the plurality of Y-axis-direction sensor coil groups includes the unit sensor coils that are wound in the first winding direction and are arranged in a staggered manner in the Y axis direction.

9. A foreign object detection device comprising:
a set sensor coil; and
a determination device that detects a foreign object, based on an electromotive force of the set sensor coil,
wherein the set sensor coil includes a plurality of sensor coil groups,
each of the plurality of sensor coil groups includes at least one of
(i) a plurality of unit sensor coils that are wound in a first winding direction and generate a first-sign electromotive force that causes a current to flow in a first direction in response to a change in an external magnetic field, and
(ii) a plurality of unit sensor coils that are wound in a second winding direction between the plurality of unit sensor coils that are wound in the first winding direction, and generate a second-sign electromotive force that causes a current to flow in a second direction opposite to the first direction in response to the change in the external magnetic field,
each of the plurality of unit sensor coils has a coil conductor that prescribes an external shape of the unit sensor coil,
a plurality of the coil conductors included in each of the plurality of sensor coil groups are continuously and electrically connected in series, and
an external shape of each of the plurality of unit sensor coils that are wound in the second winding direction is prescribed when the coil conductor of each of the plurality of unit sensor coils that are wound in the first winding direction prescribes the external shape of the unit sensor coil.

10. The foreign object detection device according to claim 9,
wherein the coil conductors of one sensor coil group among the plurality of sensor coil groups are disposed away from the coil conductors of another sensor coil group.

11. The foreign object detection device according to claim 9, wherein the coil conductors of one sensor coil group among the plurality of sensor coil groups are displaced with respect to the coil conductors of another sensor coil group.

12. The foreign object detection device according to claim 11,
wherein a part or a whole of the coil conductor forming the unit sensor coil wound in the first winding direction is a part or a whole of the coil conductor forming the unit sensor coil wound in the second winding direction.

13. The foreign object detection device according to claim 9, further comprising
a switch that selects a sensor coil group to be driven from among the plurality of sensor coil groups.

14. The foreign object detection device according to claim 13,
wherein the switch drives simultaneously at least two sensor coil groups from among the plurality of sensor coil groups, and
in each of the at least two sensor coil groups, a total number of the plurality of unit sensor coils wound in the first winding direction is equal to a total number of the plurality of unit sensor coils wound in the second winding direction.

* * * * *